(12) United States Patent
Takenaka

(10) Patent No.: US 12,055,102 B2
(45) Date of Patent: Aug. 6, 2024

(54) PLANT OPERATION METHOD, CONTROL DEVICE, AND PROGRAM

(71) Applicant: Mitsubishi Power, Ltd., Yokohama (JP)

(72) Inventor: Kodai Takenaka, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 333 days.

(21) Appl. No.: 17/057,260

(22) PCT Filed: Jul. 4, 2019

(86) PCT No.: PCT/JP2019/026558
§ 371 (c)(1),
(2) Date: Nov. 20, 2020

(87) PCT Pub. No.: WO2020/013063
PCT Pub. Date: Jan. 16, 2020

(65) Prior Publication Data
US 2021/0215105 A1 Jul. 15, 2021

(30) Foreign Application Priority Data
Jul. 9, 2018 (JP) .................................. 2018-129861

(51) Int. Cl.
*F02C 9/28* (2006.01)
*F01D 15/10* (2006.01)
(Continued)

(52) U.S. Cl.
CPC ................ *F02C 9/28* (2013.01); *F01D 15/10* (2013.01); *F02C 9/54* (2013.01); *G06Q 30/0284* (2013.01);
(Continued)

(58) Field of Classification Search
USPC ........................................................ 700/1, 90
See application file for complete search history.

(56) References Cited

U.S. PATENT DOCUMENTS

| | | | | |
|---|---|---|---|---|
| 2014/0181020 A1* | 6/2014 | Kreindlina | ............ | G06F 16/258 707/624 |
| 2016/0094628 A1* | 3/2016 | Husain | ............... | G05B 19/0426 700/275 |

(Continued)

FOREIGN PATENT DOCUMENTS

| | | |
|---|---|---|
| EP | 3 354 880 | 8/2018 |
| JP | 2008-243073 | 10/2008 |

(Continued)

OTHER PUBLICATIONS

International Search Report issued Oct. 1, 2019 in International (PCT) Application No. PCT/JP2019/026558 with English translation.

(Continued)

*Primary Examiner* — Emilio J Saavedra
(74) *Attorney, Agent, or Firm* — Wenderoth, Lind & Ponack, L.L.P.

(57) ABSTRACT

A plant operation method having: an exchange step for exchanging a first component provided in a plant for a second component capable of operating the plant with higher performance than the first component; an introduction step for introducing a first program for causing the plant to be operated using the second component with a first performance equivalent to or higher than that achieved when using the first component, and a second program for causing the plant to be operated with a second performance higher than or equal to the first performance; and a switching step for switching between the first program and the second program.

9 Claims, 15 Drawing Sheets

| PLANT | UPGRADE | TYPES OF COMPONENTS | | | INTRODUCEABLE PROGRAM | CONTROLLER 290d FUNCTION FX |
|---|---|---|---|---|---|---|
| | | ROTOR BLADE | STATOR BLADE | ... | | |
| A | BEFORE | ROTOR BLADE 2 | STATOR BLADE 1 | ... | PROGRAM 2 | FX2 |
| | AFTER | ROTOR BLADE 3 | STATOR BLADE 1 | ... | PROGRAM 2 or 3 | FX2 or FX3 |
| B | BEFORE | ROTOR BLADE 1 | STATOR BLADE 1 | ... | PROGRAM 1 | FX1 |
| | AFTER | ROTOR BLADE 1 | STATOR BLADE 2 | ... | PROGRAM 1 or 4 | FX1 or FX4 |
| C | BEFORE | ROTOR BLADE 1 | STATOR BLADE 1 | ... | PROGRAM 1 | FX1 |
| | AFTER | ROTOR BLADE 3 | STATOR BLADE 2 | ... | PROGRAM 1 or 5 | FX1 or FX5 |
| ... | ... | ... | ... | ... | ... | ... |

TBL2

(51) Int. Cl.
*F02C 9/54*      (2006.01)
*G06Q 30/0283*   (2023.01)
*G06Q 50/06*     (2012.01)

(52) U.S. Cl.
CPC ......... *G06Q 50/06* (2013.01); *F05D 2230/80* (2013.01); *F05D 2270/20* (2013.01); *F05D 2270/303* (2013.01); *F05D 2270/708* (2013.01); *Y02P 90/30* (2015.11)

(56) References Cited

U.S. PATENT DOCUMENTS

| | | |
|---|---|---|
| 2018/0283288 A1 | 10/2018 | Ishii et al. |
| 2020/0150610 A1 | 5/2020 | Imakita et al. |
| 2021/0065147 A1* | 3/2021 | Ene ........................ G06Q 50/18 |

FOREIGN PATENT DOCUMENTS

| | | | |
|---|---|---|---|
| JP | 2008243073 A * | 10/2008 | |
| JP | 2015-232888 | 12/2015 | |
| JP | 6033391 B1 * | 11/2016 | ................ F02C 3/04 |
| JP | 2017-096155 | 6/2017 | |
| JP | 2019-008579 | 1/2019 | |
| KR | 10-2018-0053403 | 5/2018 | |
| WO | 03/028779 | 4/2003 | |

OTHER PUBLICATIONS

Written Opinion of the International Searching Authority issued Oct. 1, 2019 in International (PCT) Application No. PCT/JP2019/026558 with English translation.
Nikkei newspaper, Jun. 9, 2016 with partial translation.

* cited by examiner

FIG. 7

| CUSTOMER | CONTRACT CONTENT | TYPES OF COMPONENTS | | ... | INTRODUCEABLE PROGRAM | INTRODUCED PROGRAM | INTRODUCTION TIME | | CHARGE AMOUNT CALCULATION FORMULA |
|---|---|---|---|---|---|---|---|---|---|
| | | ROTOR BLADE | STATOR BLADE | | | | TIME A | TIME B | |
| A COMPANY | CONTENT 1 | ROTOR BLADE 3 | STATOR BLADE 1 | ... | PROGRAM 2 or 3 | PROGRAM 3 | TIME 1 | TIME 2 | CALCULATION FORMULA 1 |
| B COMPANY | CONTENT 2 | ROTOR BLADE 1 | STATOR BLADE 2 | ... | PROGRAM 1 or 4 | PROGRAM 4 | TIME 3 | TIME 4 | CALCULATION FORMULA 2 |
| C COMPANY | CONTENT 2 | ROTOR BLADE 3 | STATOR BLADE 2 | ... | PROGRAM 1 or 5 | PROGRAM 1 | TIME 5 | TIME 6 | CALCULATION FORMULA 3 |
| ... | ... | ... | ... | ... | ... | ... | ... | ... | ... |

TBL1

FIG. 8

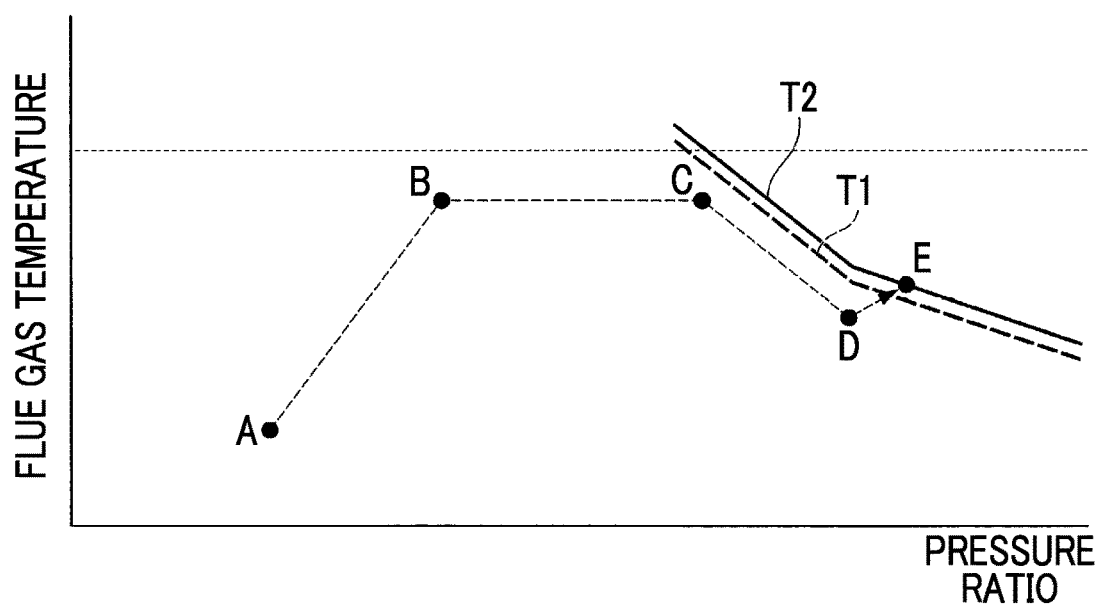

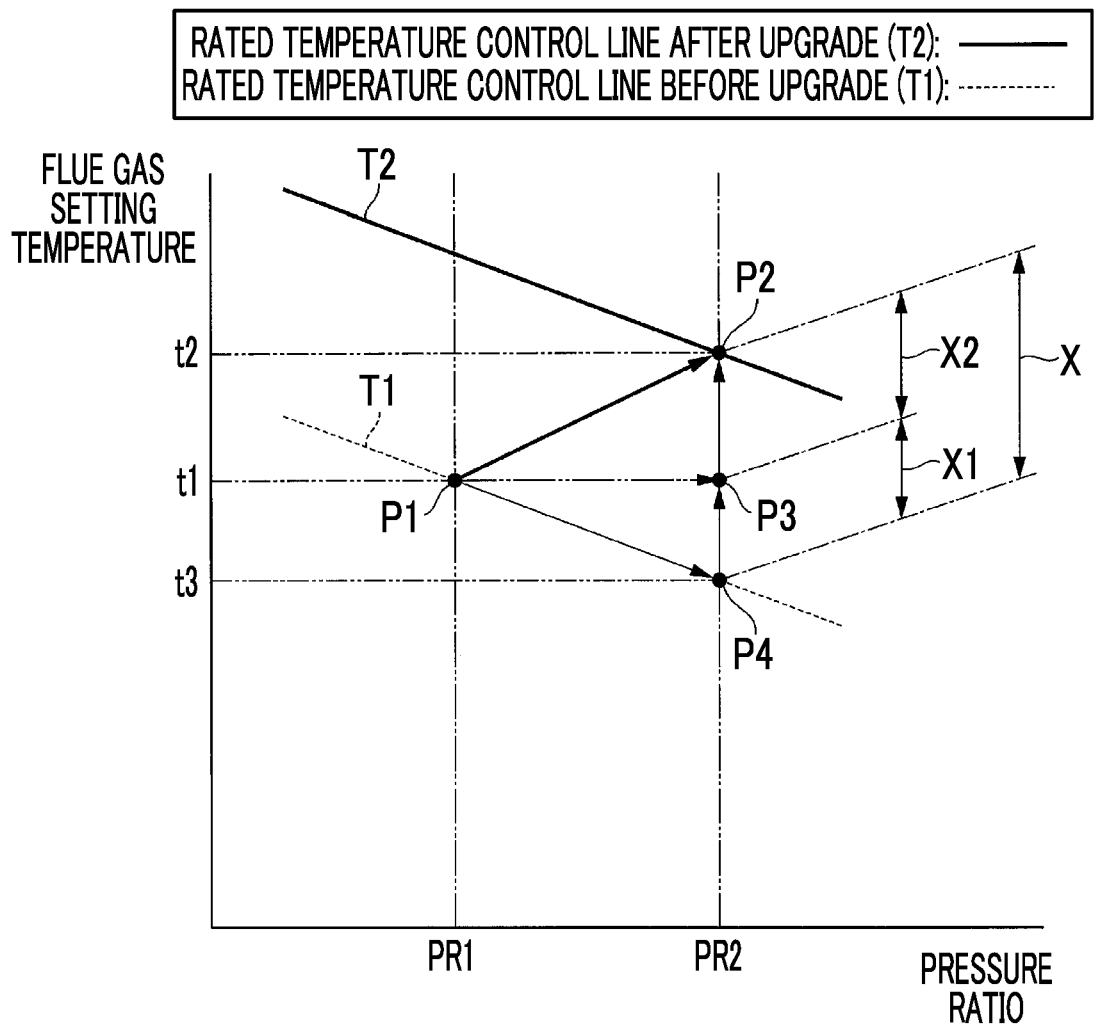

FIG. 10

| PLANT | UPGRADE | TYPES OF COMPONENTS | | | INTRODUCEABLE PROGRAM | CONTROLLER 290d FUNCTION FX |
|---|---|---|---|---|---|---|
| | | ROTOR BLADE | STATOR BLADE | ... | | |
| A | BEFORE | ROTOR BLADE 2 | STATOR BLADE 1 | ... | PROGRAM 2 | FX2 |
| A | AFTER | ROTOR BLADE 3 | STATOR BLADE 1 | ... | PROGRAM 2 or 3 | FX2 or FX3 |
| B | BEFORE | ROTOR BLADE 1 | STATOR BLADE 1 | ... | PROGRAM 1 | FX1 |
| B | AFTER | ROTOR BLADE 1 | STATOR BLADE 2 | ... | PROGRAM 1 or 4 | FX1 or FX4 |
| C | BEFORE | ROTOR BLADE 1 | STATOR BLADE 1 | ... | PROGRAM 1 | FX1 |
| C | AFTER | ROTOR BLADE 3 | STATOR BLADE 2 | ... | PROGRAM 1 or 5 | FX1 or FX5 |
| ... | ... | ... | ... | ... | ... | ... |

TBL2

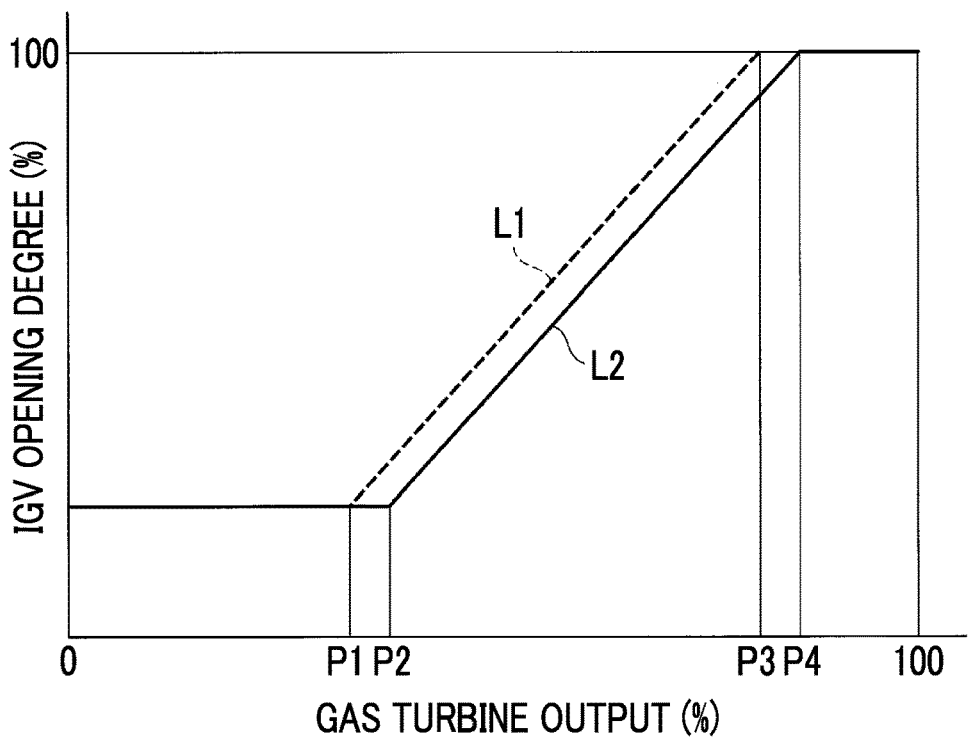

| PLANT | UPGRADE | TYPES OF COMPONENTS | | | INTRODUCEABLE PROGRAM | CONTROLLER 290b FUNCTION FX |
|---|---|---|---|---|---|---|
| | | ROTOR BLADE | STATOR BLADE | ... | | |
| A | BEFORE | ROTOR BLADE 2 | STATOR BLADE 1 | ... | PROGRAM 2 | FX2a |
| | AFTER | ROTOR BLADE 3 | STATOR BLADE 1 | ... | PROGRAM 2 or 3 | FX2a or FX3a |
| B | BEFORE | ROTOR BLADE 1 | STATOR BLADE 1 | ... | PROGRAM 1 | FX1a |
| | AFTER | ROTOR BLADE 1 | STATOR BLADE 2 | ... | PROGRAM 1 or 4 | FX1a or FX4a |
| C | BEFORE | ROTOR BLADE 1 | STATOR BLADE 1 | ... | PROGRAM 1 | FX1a |
| | AFTER | ROTOR BLADE 3 | STATOR BLADE 2 | ... | PROGRAM 1 or 5 | FX1a or FX5a |
| ... | ... | ... | ... | ... | ... | ... |

FIG. 16

TBL4

| PLANT | UPGRADE | TYPES OF COMPONENTS | | | INTRODUCEABLE PROGRAM | CONTROLLER 290e FUNCTION FX | CONTROLLER 290f FUNCTION FX |
|---|---|---|---|---|---|---|---|
| | | ROTOR BLADE | STATOR BLADE | ... | | | |
| A | BEFORE | ROTOR BLADE 2 | STATOR BLADE 1 | ... | PROGRAM 2 | FX2b | FX2c |
| | AFTER | ROTOR BLADE 3 | STATOR BLADE 1 | ... | PROGRAM 2 or 3 | FX2b or FX3b | FX2c or FX3c |
| B | BEFORE | ROTOR BLADE 1 | STATOR BLADE 1 | ... | PROGRAM 1 | FX1b | FX1c |
| | AFTER | ROTOR BLADE 1 | STATOR BLADE 2 | ... | PROGRAM 1 or 4 | FX1b or FX4b | FX1c or FX4c |
| C | BEFORE | ROTOR BLADE 1 | STATOR BLADE 1 | ... | PROGRAM 1 | FX1b | FX1c |
| | AFTER | ROTOR BLADE 3 | STATOR BLADE 2 | ... | PROGRAM 1 or 5 | FX1b or FX5b | FX1c or FX5c |
| ... | ... | ... | ... | ... | ... | ... | ... |

FIG. 18

| PLANT | UPGRADE | TYPES OF COMPONENTS | | ... | INTRODUCEABLE PROGRAM | CONTROLLER 290d FUNCTION FX |
|---|---|---|---|---|---|---|
| | | ROTOR BLADE | STATOR BLADE | | | |
| A | BEFORE | ROTOR BLADE 2 | STATOR BLADE 1 | ... | PROGRAM 2 | FX2 |
| | AFTER | ROTOR BLADE 3 | STATOR BLADE 1 | ... | PROGRAM 2, 3 or 6 | FX2, FX3 or FX6 |
| B | BEFORE | ROTOR BLADE 1 | STATOR BLADE 1 | ... | PROGRAM 1 | FX1 |
| | AFTER | ROTOR BLADE 1 | STATOR BLADE 2 | ... | PROGRAM 1, 4 or 7 | FX1, FX4 or FX7 |
| C | BEFORE | ROTOR BLADE 1 | STATOR BLADE 1 | ... | PROGRAM 1 | FX1 |
| | AFTER | ROTOR BLADE 3 | STATOR BLADE 2 | ... | PROGRAM 1, 5 or 8 | FX1, FX5 or FX8 |
| ... | ... | ... | ... | ... | ... | ... |

TBL6

FIG. 19

| PLANT | UPGRADE | TYPES OF COMPONENTS | | | INTRODUCEABLE PROGRAM | CONTROLLER 290d FUNCTION FX | CONTROLLER 290b FUNCTION FX | CONTROLLER 290e FUNCTION FX | CONTROLLER 290f FUNCTION FX |
|---|---|---|---|---|---|---|---|---|---|
| | | ROTOR BLADE | STATOR BLADE | ... | | | | | |
| A | BEFORE | ROTOR BLADE 2 | STATOR BLADE 1 | ... | PROGRAM 2 | FX2 | FX2a | FX2b | FX2c |
| A | AFTER | ROTOR BLADE 3 | STATOR BLADE 1 | ... | PROGRAM 2, 3 or 6 | FX2, FX3 or FX6 | FX2a or FX3a | FX2b or FX3b | FX2c or FX3c |
| B | BEFORE | ROTOR BLADE 1 | STATOR BLADE 1 | ... | PROGRAM 1 | FX1 | FX1a | FX1b | FX1c |
| B | AFTER | ROTOR BLADE 1 | STATOR BLADE 2 | ... | PROGRAM 1, 4 or 7 | FX1, FX4 or FX7 | FX1a or FX4a | FX1b or FX4b | FX1c or FX4c |
| C | BEFORE | ROTOR BLADE 1 | STATOR BLADE 1 | ... | PROGRAM 1 | FX1 | FX1a | FX1b | FX1c |
| C | AFTER | ROTOR BLADE 3 | STATOR BLADE 2 | ... | PROGRAM 1, 5 or 8 | FX1, FX5 or FX8 | FX1a or FX5a | FX1b or FX5b | FX1c or FX5c |
| ... | | | | | | | | | |

TBL5

PLANT OPERATION METHOD, CONTROL DEVICE, AND PROGRAM

This application claims priority to Japanese Patent Application No. 2018-129861, filed in Japan on Jul. 9, 2018, the contents of which are incorporated herein by reference.

TECHNICAL FIELD

The present invention relates to a plant operation method, a control device, and a program.

BACKGROUND ART

In a plant including a gas turbine and the like, a component may be replaced with an upgraded component in order to improve the performance of the plant.

In PTL 1, as a relevant technique, a technique is disclosed which replaces a component with an upgraded component and then changes a setting value to a suitable setting value of a control device.

CITATION LIST

Patent Literature

[PTL 1] Japanese Unexamined Patent Application Publication No. 2017-096155

SUMMARY OF INVENTION

Technical Problem

In general, the upgraded component is more expensive than the component used before the upgrade. Therefore, in a case of considering introducing an upgraded component into the plant, even though the customer understands that cost is reduced and income is increased by the performance improvement after the introduction, the customer may give up the introduction from the viewpoint of initial cost at the time of introduction.

An object of the present invention is to provide a plant operation method, a control device, and a program which can solve the above problem.

Solution to Problem

According to a first aspect of the present invention, a plant operation method includes a replacement step of replacing a first component provided in a plant with a second component able to operate the plant with a higher performance than the first component; an introduction step of introducing a first program for causing the plant to be operated using the second component with a first performance equivalent to or higher than a performance achieved in a case of using the first component, and a second program for causing the plant to be operated with a second performance higher than the first performance; and a first switching step of switching between the first program and the second program.

According to a second aspect of the present invention, the plant operation method according to the first aspect may further include a calculation step of calculating a charge amount on the basis of switching between the first program and the second program.

According to a third aspect of the present invention, the plant operation method according to the second aspect may further include an identification step of identifying an execution time for which the second program is executed, and in the calculation step, the charge amount may be calculated according to the execution time.

According to a fourth aspect of the present invention, in the plant operation method according to the second or third aspect, the first switching step may be executed by a charged customer, and in the calculation step, the charge amount may be calculated on the basis of switching between the first program and the second program in the first switching step executed by the customer.

According to a fifth aspect of the present invention, the plant operation method according to the fourth aspect may further include a second switching step of switching the second program to the first program regardless of execution by the charged customer.

According to a sixth aspect of the present invention, in the plant operation method according to the second or third aspect, the first switching step may be executed by a charging administrator, and in the calculation step, the charge amount may be calculated on the basis of switching between the first program and the second program in the first switching step executed by the administrator.

According to a seventh aspect of the present invention, in the plant operation method according to any one of the first to sixth aspects, the second component may be a component that withstands a higher temperature than the first component; in the first switching step, switching to the second program may be performed; and the second program may cause the plant to be operated such that a temperature of the second component is a high temperature that the second component withstands.

According to an eighth aspect of the present invention, a control device includes a storage unit that stores a first program for causing a plant to be operated using a second component, which is able to operate the plant with a higher performance than a first component provided in the plant, with a first performance equivalent to or higher than a performance achieved in a case of using the first component, and a second program for causing the plant to be operated with a second performance higher than the first performance; and a switching unit that switches between the first program and the second program.

According to a ninth aspect of the present invention, a program causes a computer to execute a first logic for causing a plant to be operated using a second component, which is able to operate the plant with a higher performance than a first component provided in the plant, with a first performance equivalent to or higher than a performance achieved in a case of using the first component; a second logic for causing the plant to be operated with a second performance higher than the first performance; and a switching logic for switching between the first logic and the second logic.

Advantageous Effects of Invention

According to the plant operation method, the control device, and the program according to embodiments of the present invention, an opportunity to easily introduce upgraded components to a plant can be provided to a customer.

BRIEF DESCRIPTION OF DRAWINGS

FIG. 7 is a diagram illustrating a first data table in the embodiment of the present invention.

FIG. 8 is a diagram illustrating a relationship between a pressure ratio and a flue gas temperature upper limit in the embodiment of the present invention.

FIG. 9 is a diagram illustrating a relationship between a flue gas setting temperature and a pressure ratio of a rated temperature control line in the embodiment of the present invention.

FIG. 10 is a diagram illustrating a second data table in the embodiment of the present invention.

FIG. 12 is a diagram illustrating a relationship between a gas turbine output and an IGV opening degree setting value in the embodiment of the present invention.

FIG. 13 is a diagram illustrating a third data table in the embodiment of the present invention.

FIG. 16 is a diagram illustrating a fourth data table in the embodiment of the present invention.

FIG. 18 is a diagram illustrating a second data table in another embodiment of the present invention.

FIG. 19 is a diagram illustrating a fifth data table in another embodiment of the present invention.

DESCRIPTION OF EMBODIMENTS

Embodiments

Hereinafter, embodiments will be described in detail with reference to the drawings.

A configuration of a plant operation system 1 according to an embodiment of the present invention will be described.

The plant operation system 1 is a system which, in a case where some of components constituting a gas turbine 2 are replaced with upgraded components, introduces a first software before the replacement and a second software that is different from the first software and can bring out the performance of the replaced components, and switches between the first software and the second software according to the customer's needs. Further, the plant operation system 1 is a system which records the switching between the first software and the second software, and calculates the charge to the customer according to the switching. The plant operation system 1 includes the gas turbine 2 and a control system 3.

Figure 1:
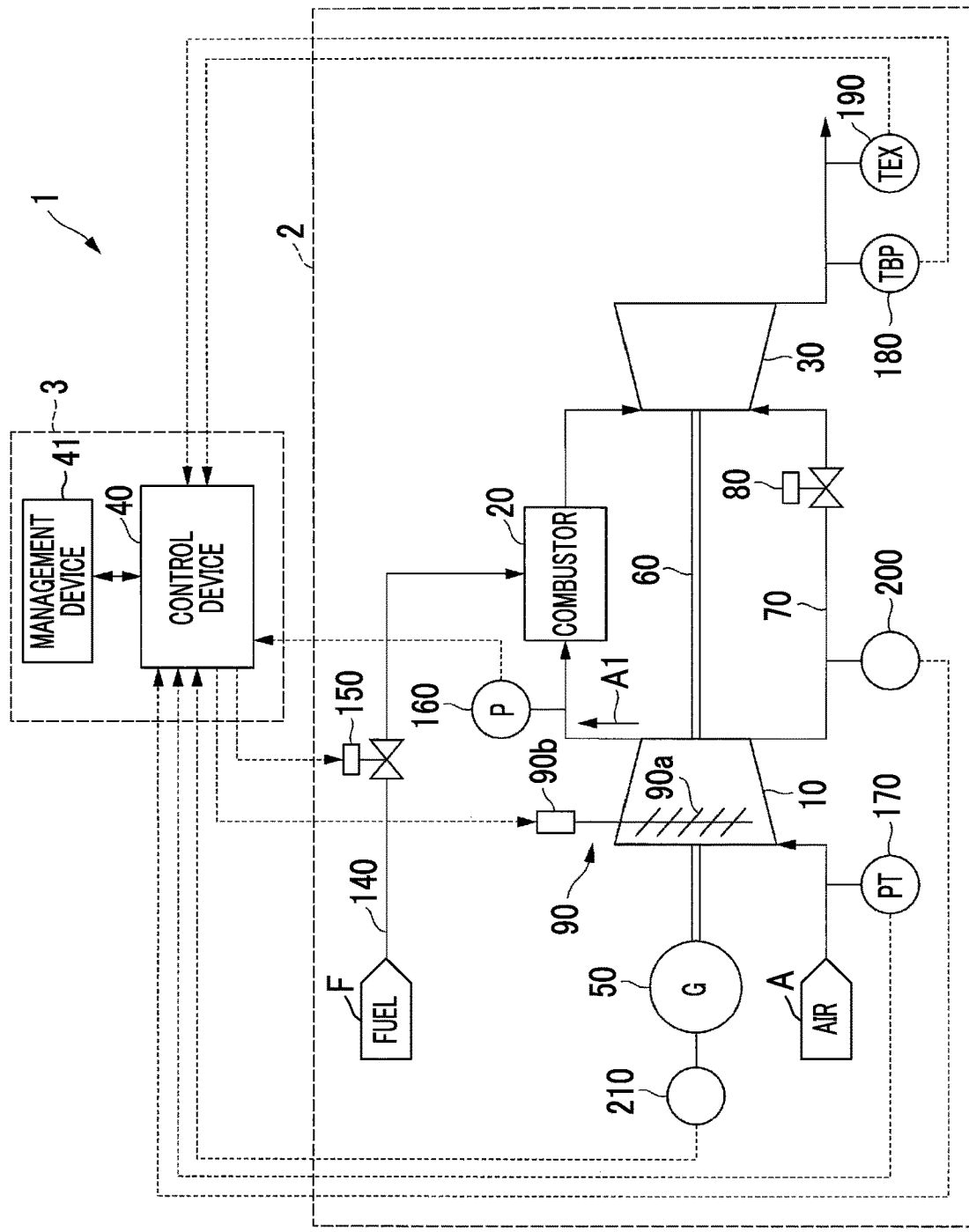
FIG. 1 is a diagram illustrating a configuration of a plant operation system according to an embodiment of the present invention.

As illustrated in FIG. 1, the gas turbine 2 includes a compressor 10, a combustor 20, a turbine 30, a generator 50, and a rotor 60.

The rotor 60 is provided to penetrate the central portion of the compressor 10, the combustor 20, and the turbine 30. The compressor 10, the turbine 30, and the generator 50 are connected by the rotor 60 to be integrally rotated. The generator 50 can generate power by the rotation. The operation of the gas turbine 2 is controlled by the control system 3.

The gas turbine 2 has a cooling air supply line 70 that supplies cooling air from the compressor 10 to the turbine 30. A cooling air control valve 80 is provided in the cooling air supply line 70.

The compressor 10 compresses air A taken from an air intake port to generate compressed air A1. An inlet guide vane (IGV, intake valve) 90 that adjusts an intake amount of the air A taken from the air intake port is provided in the compressor 10.

The inlet guide vane 90 includes a plurality of vane main bodies 90a and an IGV operation unit 90b for changing the vane angles of the plurality of vane main bodies 90a. The inlet guide vane 90 adjusts the intake amount of the air A by the opening degree thereof being adjusted. Specifically, the vane angle of the vane main body 90a is adjusted by the IGV operation unit 90b so that the opening degree of the inlet guide vane 90 is adjusted, thereby adjusting the intake amount of the air A. In a case where the opening degree of the inlet guide vane 90 is increased, the intake amount of the air A is increased, and the pressure ratio of the compressor 10 is increased. Further, in a case where the opening degree of the inlet guide vane is decreased, the intake amount of the air A is decreased, and the pressure ratio of the compressor 10 is reduced.

Figure 2:
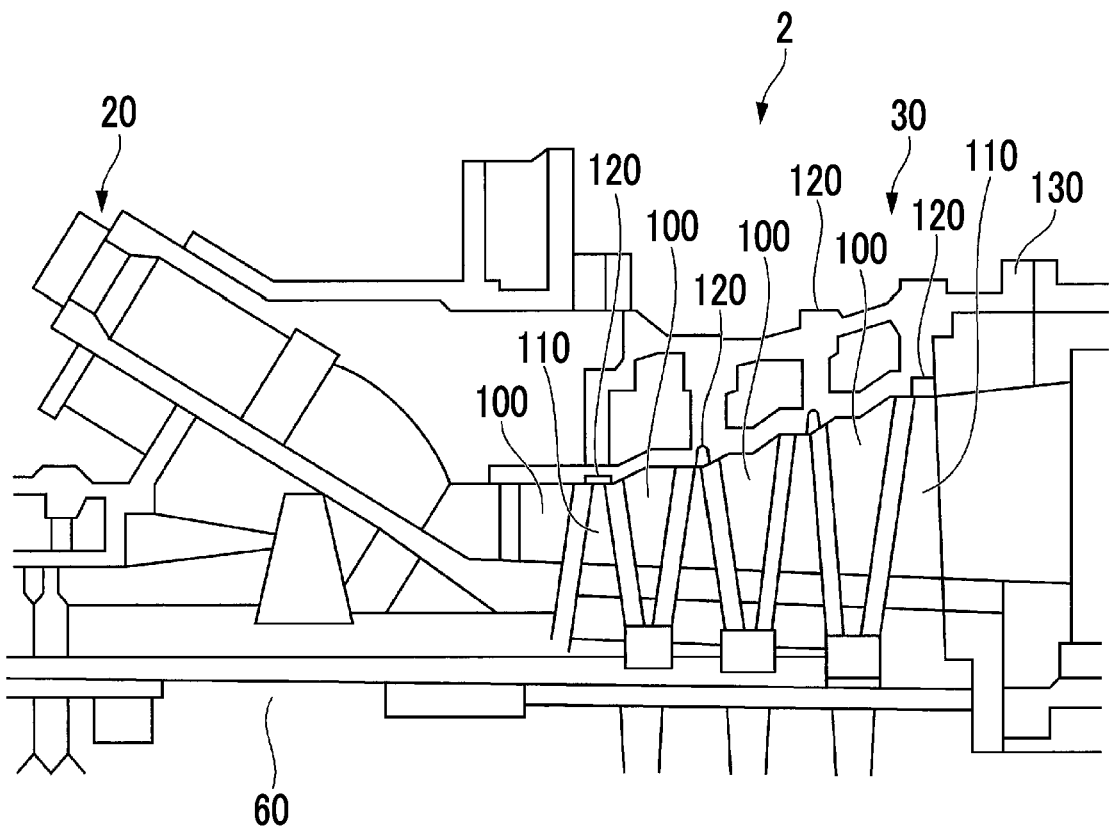
FIG. 2 is a diagram schematically illustrating a configuration of a part of a turbine according to the embodiment of the present invention.

The combustor 20 supplies a fuel F to the compressed air A1 compressed by the compressor 10. The combustor 20 mixes and combusts the compressed air A1 and the fuel F to generate combustion gas. The turbine 30 is rotated by the combustion gas generated by the combustor 20. FIG. 2 is a diagram schematically illustrating a configuration of a part of the turbine 30 in the gas turbine 2. As illustrated in FIG. 2, the turbine 30 includes the rotor 60, a plurality of stages of stator blades 100, and a plurality of stages of rotor blades 110. The stator blades 100 in each stage are attached to a casing 130. The rotor blades 110 in each stage are fixed to the outer circumference of the rotor 60. The plurality of stages of stator blades 100 and the plurality of stages of rotor blades 110 are alternately provided in an axial direction of the rotor 60. Further, a split ring 120 is provided in the casing 130. The split ring 120 is provided on the outer side of the rotor blades 110 in a radial direction so as to be spaced apart from the rotor blades 110. The stator blades 100 and the split ring 120 are disposed to be spaced apart from each other in the axial direction of the rotor 60.

The rotor 60 is provided such that both end portions of the rotor 60 in the axial direction are rotatably supported by bearing portions (not illustrated) and the rotor 60 can be freely rotated about its axis. A drive shaft of the generator 50 is connected to the end portion of the rotor 60 on the compressor 10 side. The generator is provided coaxially with the turbine 30, and generates power by the rotation of the turbine 30.

Accordingly, the air A taken from the air intake port of the compressor 10 is compressed by passing through the inside of the compressor 10 via the inlet guide vane to become the high-temperature and high-pressure compressed air A1. The combustor 20 supplies the fuel F to the compressed air A1, and the compressed air A1 and the fuel F are mixed and combusted to generate high-temperature and high-pressure combustion gas. Then, the high-temperature and high-pressure combustion gas generated by the combustor 20 passes through the inside of the turbine 30 to operate (rotate) the turbine 30, to rotate the rotor 60, and to drive the generator 50 connected to the rotor 60. Thereby, the generator 50 generates power. At this time, the combustion gas used to drive the turbine 30 is released, as the flue gas, to the atmosphere with the heat thereof being recovered.

In the gas turbine 2, in order to improve the performance (for example, output power, power generation efficiency, and reduction in discharge of gas such as NOx), an upgrade of reducing the supply amount of the cooling air to be supplied to the turbine 30 and increasing the supply amount of the compressed air to be supplied to the combustor 20 may be performed. In a case of performing such an upgrade, the components such as the rotor blades and the stator blades provided in the turbine 30 are replaced with components (hereinafter, referred to as "high-temperature component") which can withstand a high temperature and can be cooled by the reduced supply amount of cooling air.

In the upgrade of the gas turbine 2, in some cases, the components constituting the turbine 30, such as the stator blades 100, the rotor blades 110, and the split ring 120 are replaced. In the embodiment, in a case where the upgrade of the gas turbine 2 is performed, a case where, among the components constituting the turbine 30, the stator blades 100 at the first and second stages and the rotor blades 110 at the first and second stages are replaced with new components is described as an example. The components to be replaced are not limited thereto, and components may be replaced in other combinations.

As illustrated in FIG. 1, the gas turbine 2 is provided with a cylinder pressure gauge 160, an intake air condition detector 170, a blade pass thermometer 180, a flue gas thermometer 190, and a flowmeter 200. The cylinder pressure gauge 160 is provided in a line where the compressed air A1 flows from the compressor 10 to the combustor 20. Specifically, the cylinder pressure gauge 160 is provided in the cylinder of the combustor 20, and measures the pressure of the compressed air A1 (cylinder pressure). The intake air condition detector 170 detects the intake air temperature and the intake air pressure of the air A taken into the compressor 10. The blade pass thermometer 180 is provided in a line where the flue gas discharged from the turbine 30 flows. The blade pass thermometer 180 measures the temperature of the flue gas that has passed through the blade at the final stage provided on the downstream side of the turbine 30 in the flue gas flowing direction. The flue gas thermometer 190 is provided on the downstream side of the blade pass thermometer 180, and measures the temperature of the flue gas. The flowmeter 200 measures the flow rate of the cooling air that flows in the cooling air supply line 70. Further, the gas turbine 2 is provided with an output meter 210 that detects the output (load) of the gas turbine 2. The signals measured by the cylinder pressure gauge 160, the intake air condition detector 170, the blade pass thermometer 180, the flue gas thermometer 190, the flowmeter 200, and the output meter 210 are input to the control system 3.

As illustrated in FIG. 1, the control system 3 includes a control device 40 and a management device 41.

Figure 3:
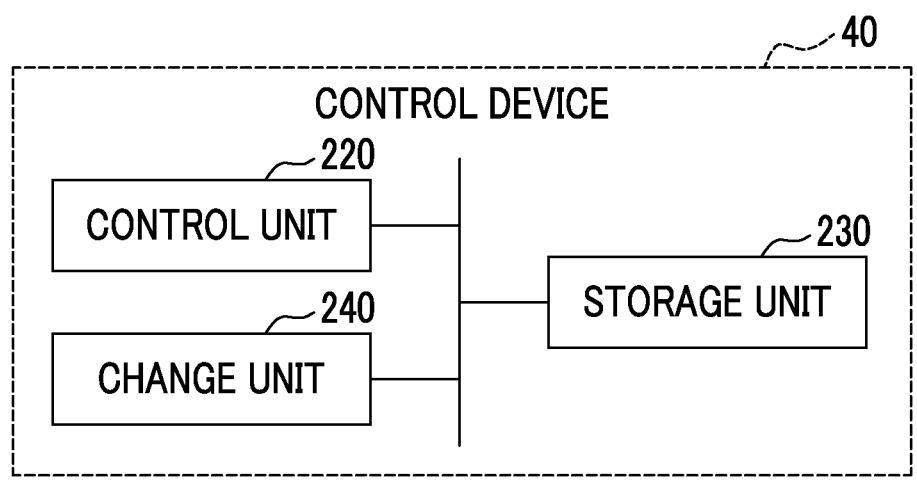
FIG. 3 is a diagram illustrating a configuration of a control device according to the embodiment of the present invention.

The control device 40 is a device that controls the operation of the gas turbine 2. The control device 40 is, for example, a device owned by the customer, and by introducing one of a plurality of programs that are introduceable by the customer after the components are upgraded, the plant is operated with the performance according to the introduced program. As illustrated in FIG. 3, the control device 40 includes a control unit 220, a storage unit 230, a change unit 240 (an example of a switching unit). The control unit 220 controls the operation of the gas turbine 2 by controlling the inlet guide vane 90, a fuel regulating valve 150, and the like on the basis of the measurement results of the cylinder pressure gauge 160, the intake air condition detector 170, the blade pass thermometer 180, the flue gas thermometer 190, the flowmeter 200, and the like. Further, the control unit 220 controls the operation of the gas turbine 2 according to the output of the gas turbine 2 (output of the generator 50). The control unit 220 causes the gas turbine 2 to perform a partial load operation and a full load operation. The full load operation is an operation where the output of the gas turbine 2 becomes the rated output. The partial load operation is an operation where the output of the gas turbine 2 becomes an output lower than the rated output.

In order to adjust the supply amount of the fuel F, the control unit 220 executes a fuel control for controlling the fuel regulating valve 150 provided in a fuel supply line 140 through which the fuel F is supplied to the combustor 20. The fuel supply line 140 has a plurality of supply lines such as a main fuel supply line, a pilot fuel supply line, a top hat fuel supply line. The fuel regulating valve 150 is provided in each of the plurality of supply lines. The opening degree of the fuel regulating valve 150 can be individually controlled. The control unit 220 controls the fuel regulating valve 150 to adjust the supply amount and the distribution of the fuel F to be supplied (ejected) to the compressed air A1.

Figure 4:
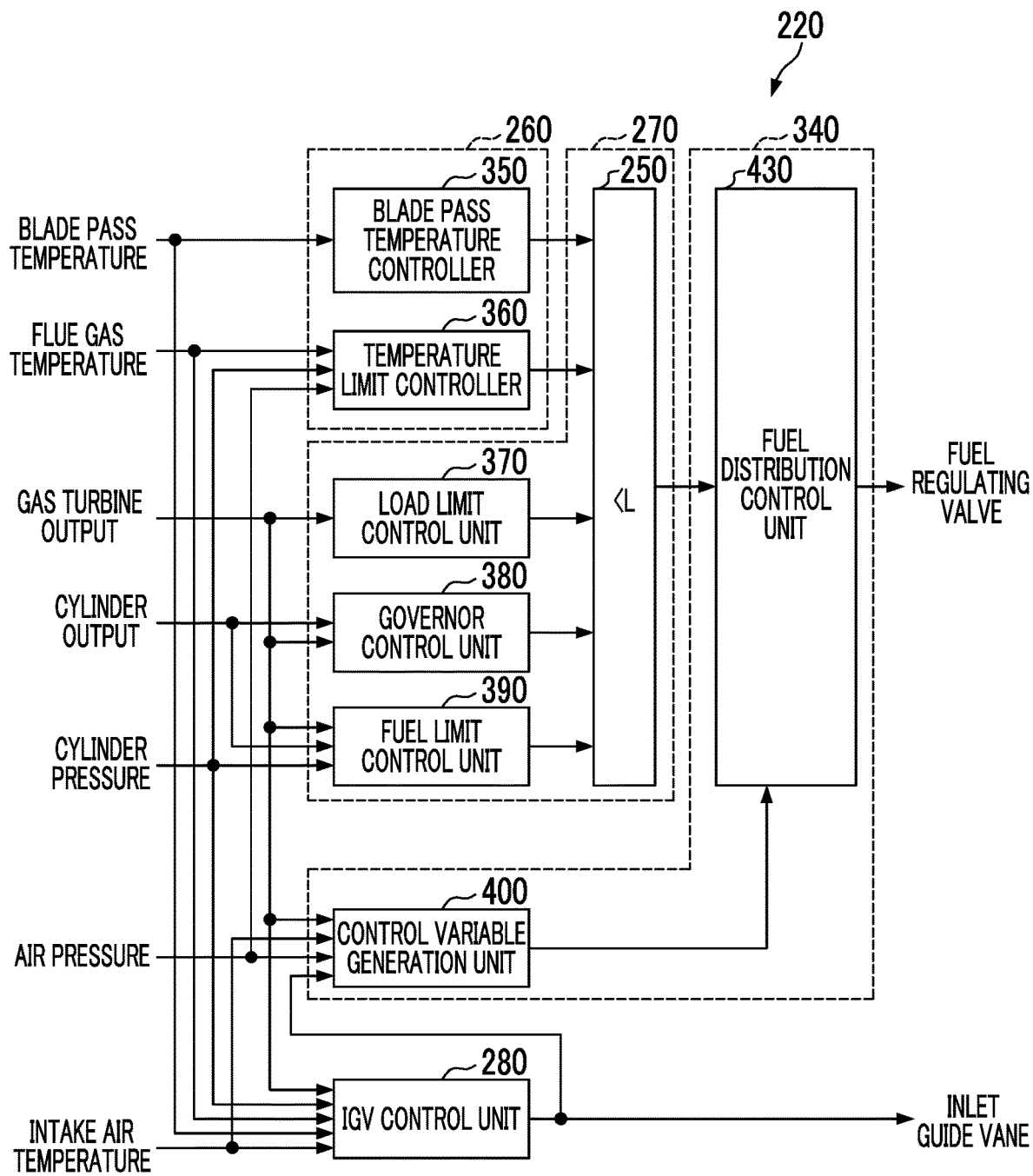
FIG. 4 is a diagram illustrating a configuration of a control unit according to the embodiment of the present invention.

FIG. 4 is a diagram illustrating a configuration of the control unit 220. As illustrated in FIG. 4, the control unit 220 includes a flue gas temperature control unit 260, a combustion control unit 270, an IGV control unit 280, a combustion load control unit 340.

The flue gas temperature control unit 260 sets a relationship between the flue gas temperature and the pressure ratio such that the turbine inlet temperature is maintained at a predetermined temperature. The flue gas temperature control unit 260 includes a blade pass temperature control unit 350 and a temperature limit control unit 360. A blade pass temperature measured by the blade pass thermometer 180 is input to the blade pass temperature control unit 350. The blade pass temperature control unit 350 generates a blade pass temperature setting value on the basis of the blade pass temperature, and outputs the blade pass temperature setting value to a low value selector 250 described below.

The measured values of the pressure in the cylinder (cylinder pressure) of the compressor 10 measured by the cylinder pressure gauge 160, the intake air pressure measured by the intake air condition detector 170, and the flue gas temperature measured by the flue gas thermometer 190 are input to the temperature limit control unit 360. The temperature limit control unit 360 outputs a flue gas temperature setting value on the basis of the input values.

Figure 5:
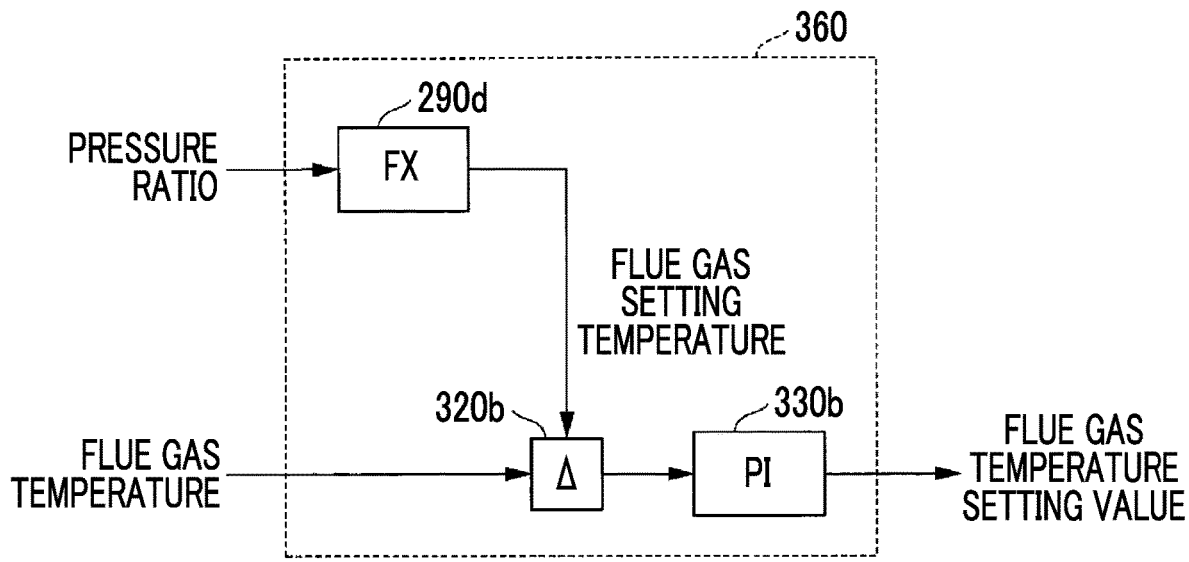
FIG. 5 is a diagram illustrating a configuration of a temperature limit control unit according to the embodiment of the present invention.

FIG. 5 is a diagram illustrating a configuration of the temperature limit control unit 360. As illustrated in FIG. 5, the temperature limit control unit 360 includes a controller 290d, a subtractor 320b, a PI controller 330b. A pressure ratio for calculating the flue gas temperature setting value is input to the controller 290d. The pressure ratio is a ratio of the cylinder pressure to the intake air pressure (cylinder pressure/intake air pressure). The value of the pressure ratio input to the controller 290d is a value set as a target value for calculating the flue gas temperature setting value. The controller 290d calculates a setting temperature of the flue gas (hereinafter, referred to as the "flue gas setting temperature") for the input pressure ratio on the basis of the input pressure ratio and a setting temperature calculation function (second function), and outputs the setting temperature of the flue gas to the subtractor 320b. The setting temperature calculation function will be described below. Further, the controller 290d outputs the calculated flue gas setting temperature to a subtractor 320a provided in the IGV control unit 280 described below.

Figure 6:
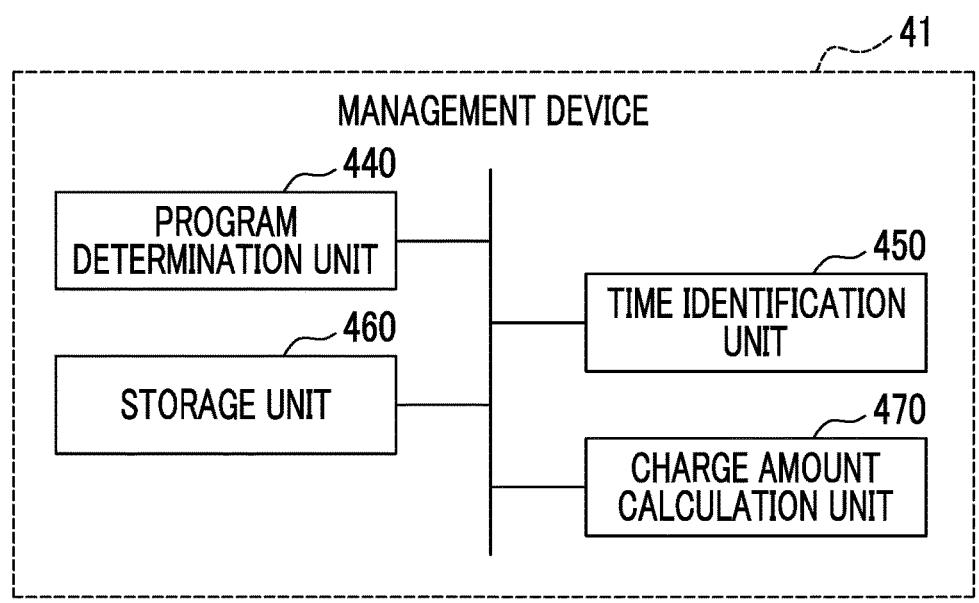
FIG. 6 is a diagram illustrating a configuration of a management device according to the embodiment of the present invention.

The management device 41 is a device provided by a distributor that sells the upgraded component to the customer or a management company that manages the plant according to the request from the distributor. The program introduced by the control device 40 is identified, and a charge amount to charge the customer is calculated on the basis of the contract content between the distributor and the customer and the identified program. As illustrated in FIG. 6, the management device 41 includes a program determination unit 440, a time identification unit 450, a storage unit 460, and a charge amount calculation unit 470. The program determination unit 440 determines the type of the program introduced by the control device 40 after the component is upgraded. The time identification unit 450 identifies the time at which the program determined by the program determination unit 440 is introduced. The storage unit 460 stores a data table TBL1. The data table TBL1 is a data table illustrated in FIG. 7, for example. As illustrated in FIG. 7, the data table TBL1 is a data table in which customer names, contract contents between the distributor and the customer, types of applied components, types of introduceable programs, introduced programs, the introduction time when the program is introduced, and charge amount calculation formulas for calculating the charge amount are associated with each other. The introduction time is identified for each introduceable program. The charge amount calculation formula is different for each contract content, and is a formula that determines one charge amount when the introduced program and the introduction time of the program are determined.

Here, the setting temperature calculation function will be described. FIG. 8 is a diagram illustrating a relationship between the pressure ratio and the flue gas setting temperature. In FIG. 8, the horizontal axis indicates the pressure ratio. In FIG. 8, the vertical axis indicates the flue gas temperature. As illustrated in FIG. 8, the setting temperature calculation function defines the relationship between the pressure ratio and the flue gas setting temperature. In the example illustrated in FIG. 8, the setting temperature calculation function is illustrated as rated temperature control lines T1 and T2. The rated temperature control lines T1 and T2 indicate the temperature of the flue gas which is set such that a rated performance of the gas turbine 2 is obtained in a case where the turbine inlet temperature reaches a rated value, for a predetermined pressure ratio. The rated performance is a performance in which the work efficiency of the gas turbine 2 is optimized when a predetermined load is given from the generator 50 to the gas turbine 2. The rated temperature control lines T1 and T2 are set such that the turbine inlet temperature does not exceed a preset upper limit temperature. The flue gas setting temperature is reduced as the pressure ratio is increased as in the rated temperature control lines T1 and T2 illustrated in FIG. 8.

A point A to a point E in FIG. 8 indicate points on the operating line of the gas turbine 2. The point A indicates the pressure ratio and the flue gas temperature when a load is given to the gas turbine 2. The point B indicates the pressure ratio and the flue gas temperature when the inlet guide vane 90 starts to be opened. A section from the point B to the point C is a control section in which the flue gas temperature is constant as the pressure ratio is increased in the process of increasing the opening degree of the inlet guide vane 90. A section from the point C to the point D is a section in which the opening degree of the inlet guide vane 90 is increased, and the inlet guide vane 90 is fully opened at the point D. The point E indicates the pressure ratio and the flue gas temperature in a case where the operating line reaches the rated temperature control line by increasing the load of the gas turbine 2 to 100% from the point D. In a case where the gas turbine 2 performs the full load operation, the operation of the gas turbine 2 is controlled such that the turbine inlet temperature approaches the upper limit temperature and the flue gas temperature approaches the rated temperature control line. Further, in a case where the gas turbine 2 performs the partial load operation, in order to ensure responsiveness of the gas turbine output to the load fluctuation, the operation of the gas turbine 2 is controlled such that, for example, the flue gas temperature is not limited by the upper limit temperature on the rated temperature control line so that the flue gas temperature is lower than the rated temperature control line. Therefore, the turbine inlet temperature in a case where the gas turbine 2 performs the partial load operation is lower than the turbine inlet temperature in a case where the gas turbine 2 performs the full load operation.

The rated temperature control line T1 indicated by a broken line in FIG. 8 illustrates an example of a setting temperature calculation function used for the configuration before the components of the gas turbine 2 are upgraded. Further, the rated temperature control line T2 indicated by a solid line in FIG. 8 illustrates an example of a setting temperature calculation function used for the configuration after the components of the gas turbine 2 are upgraded. By the upgrade of the components of the gas turbine 2, the supply amount of the cooling air is reduced and the pressure ratio in a cylinder 29 is increased. Therefore, on the rated temperature control line T2 after the upgrade of the components, the pressure ratio and the flue gas setting temperature at the point E are increased as compared with those on the rated temperature control line T1 before the upgrade of the components. The increase amount of the flue gas setting temperature can be obtained as the sum (temperature control bias change amount) of the increase amount of the flue gas setting temperature due to the decrease in supply amount of the cooling air in a case where the pressure ratio is increased with respect to the rated temperature control line T1, and the reduction amount of the flue gas setting temperature due to the increase in pressure ratio.

Here, a specific method for calculating the temperature control bias change amount will be described below using FIG. 9. FIG. 9 is a diagram illustrating a relationship between the flue gas setting temperature and the pressure ratio of the rated temperature control line. In FIG. 9, the rated temperature control line T1 before the upgrade of the components of the gas turbine 2 and the rated temperature control line T2 after the upgrade of the components of the gas turbine 2 are compared with each other. In FIG. 9, the horizontal axis indicates the pressure ratio. In FIG. 9, the vertical axis indicates the flue gas setting temperature. Here, the temperature control bias change amount means a change amount X of the flue gas temperature with respect to the same pressure ratio in a case where the rated temperature control line T1 before the upgrade of the components is changed to the rated temperature control line T2 as a result of upgrading the component of the gas turbine 2. In FIG. 9, the operating point on the rated temperature control line T1 before the upgrade of the components is P1, and the operating point after the upgrade of the components is moved to P2. The pressure ratio at the operating point P1 is PR1, the flue gas setting temperature at the operating point P1 is t1, and the pressure ratio at the operating point P2 is PR2. In addition, the point on the rated temperature control line T1 where the pressure ratio is PR2 is P4, and the flue gas setting temperature at the point P4 is t3. The point where the pressure ratio is PR2 and the flue gas setting temperature is t1 is P3.

The rated temperature control line is a line representing the relationship between the flue gas setting temperature and the pressure ratio on the condition that the turbine inlet temperature is constant, and is aimed to manage the turbine inlet temperature by monitoring the flue gas temperature. In general, in the gas turbine 2, in the process of the combustion gas undergoing thermal expansion from the cylinder pressure to the atmospheric pressure in the turbine 30, the temperature of the combustion gas is reduced due to the thermal expansion. That is, the rated temperature control line is a line in which the flue gas setting temperature is reduced to the right as pressure ratio is increased under the condition that the turbine inlet temperature is constant.

As described above, in a case where the component of the gas turbine 2 is upgraded, the pressure ratio in the cylinder 29 is increased due to the decrease in supply amount of the cooling air. Accordingly, the higher the pressure ratio is in the cylinder 29, the higher the ratio is at which the flue gas temperature is reduced due to thermal expansion. In FIG. 9, it is considered that the operating point of the gas turbine 2 is moved from the operating point P1 (pressure ratio PR1) on the rated temperature control line T1 before the upgrade of the components to the operating point P2 (pressure ratio PR2) on the rated temperature control line T2 after the upgrade of the components, by the upgrade of the components of the gas turbine 2. All the points P2, P3, and P4 described above are points at the pressure ratio PR2. The point P3 is also present on a segment P2P4.

As illustrated in FIG. 9, it can be considered that, as a result of the upgrade of the components of the gas turbine 2, for the sake of convenience, the operating point P1 before the upgrade of the components is moved to the point P4 due to the increase in pressure ratio resulting from the upgrade of the components, and reaches the operating point P2 due to an increase in flue gas temperature corresponding to the temperature control bias change amount X in the process of the movement from the point P4 to the operating point P2.

In a case where the pressure ratio is PR2, the temperature control bias change amount X is indicated by the segment P2P4. Here, the segment P2P4 is divided into a segment P3P4 and a segment P2P3, and these segments are respectively defined as variables X1 and X2. In this case, the temperature control bias change amount X can be calculated by a formula [X=X1+X2]. That is, as a result of the upgrade of the components of the gas turbine 2, the temperature control bias change amount X in the process of the change of the operating point from P1 to P2 can be described by being divided into the variable X1 corresponding to the increased amount of the temperature reduction occurring in the process in which the pressure ratio of the combustion gas is increased and the flue gas temperature is decreased, and the variable X2 corresponding to the increased amount of the temperature reduction occurring in the process in which the flue gas temperature is reduced due to the decrease in supply amount of the cooling air.

In a case where the pressure ratio in the cylinder 29 is increased from PR1 to PR2 as a result of the upgrade of the components of the gas turbine 2, the temperature reduction of the flue gas is increased due to the thermal expansion in the turbine 30 as compared with that before the upgrade of the components. The variable X1 corresponds to the increased amount of the reduction in flue gas temperature due to the increase in pressure ratio. That is, in FIG. 9, in a case where the pressure ratio in the cylinder 29 is increased from PR1 before the upgrade of the components to PR2 after the upgrade of the components, the flue gas temperature is reduced to t3 from the flue gas setting temperature t1 before the upgrade of the components due to the thermal expansion of the combustion gas in the turbine 30. The variable X1 is the increased amount of the temperature reduction in which the flue gas temperature is reduced, and corresponds to a correction amount for bringing the flue gas temperature t3 to the flue gas temperature t1 before the upgrade of the components. The temperature difference X1 between the point P3 and the point P4 is calculated by a formula [X1=t1−t3].

Next, the variable X2 corresponding to the decrease in supply amount of the cooling air will be described. As a result of the upgrade of the components of the gas turbine 2, the supply amount of the cooling air to be supplied to the components constituting the turbine 30 is reduced. Therefore, the amount of the cooling air discharged from the respective components to a combustion gas flow path is decreased, and the temperature of the combustion gas flowing through the combustion gas flow path is increased from the temperature of the combustion gas before the upgrade of the components. Moreover, in a case where components on the downstream side are upgraded, the amount of the cooling air discharged from the upgraded components is reduced, so that the temperature of the combustion gas on the downstream side of the downstream-side components is further increased from that before the upgrade of the components. By repeating this process, the temperature of the flue gas finally discharged from the turbine 30 is increased from that before the upgrade of the components. The process in which the temperature of the combustion gas is increased due to the decrease in supply amount of the cooling air resulting from the upgrade of the components is represented by the segment P2P3 in FIG. 9, and can be regarded as a correction amount corresponding to the variable X2.

The process in which the flue gas temperature is reduced due to the thermal expansion resulting from the increase in pressure ratio when the operating point is moved from the point P1 to the point P3 through the point P4, and the process in which the flue gas temperature is increased due to the decrease in supply amount of the cooling air when the operating point is moved from the point P3 to the point P2 proceed in parallel at the same time. Therefore, the actual change of the operating point can be regarded as the change from the point P1 to the point P2. Accordingly, when the operating point is moved from P1 to P2 as a result of the upgrade of the components of the gas turbine 2, the correction amount for correcting the rated temperature control line T1 to the rated temperature control line T2 can be considered as the temperature control bias change amount X, that is, the amount obtained by adding a correction amount (first correction value) as the increased amount of the reduction in flue gas temperature due to the increase in pressure ratio which corresponds to the variable X1, and a correction amount (second correction value) as the increased amount of the increase in the flue gas temperature due to the reduction in supply amount of the cooling air which corresponds to the variable X2.

Accordingly, the rated temperature control line T2 is a line obtained by increasing the pressure ratio on the rated temperature control line T1 and adding the temperature control bias change amount thereto, and thus is a line obtained by moving the rated temperature control line T1 in parallel to the upper right side in FIG. 9. In addition to the rated temperature control lines T1 and T2 illustrated in FIG. 8, a plurality of patterns of functions are set for setting temperature calculation function according to the supply amount of the cooling air after the upgrade of the components and to the locations and types of the stator blades 100, the rotor blades 110, and the split ring 120 to be replaced in the upgrade of the components. The plurality of patterns of functions are functions set using a condition that the turbine inlet temperature is constant, and are functions for setting the performance with the lowest supply amount of the cooling air in the plant in a case where the component is upgraded, that is, the performance of the plant when the plant is operated at the highest temperature allowed in a case where the component is upgraded. The plurality of patterns of functions are stored as, for example, a data table TBL2 in the storage unit 230, together with the functions used before the upgrade of the components. The data table TBL2 is a data table illustrated in FIG. 10, for example. As illustrated in FIG. 10, the data table TBL2 includes information in which types of components used, introduceable programs, functions FX set in a case where the introduceable program is introduced are associated with each other for the state before and after the upgrade for each plant. The introduceable program is prepared in advance, the function FX is updated in a case where the program is updated due to the upgrade of the components. For example, for a plant A, the introduceable program after the upgrade is a program 2 or 3. In a case where the program 2 is introduced, a function FX2 which has been used before the upgrade is applied, and in a case where the program 3 is introduced, a function FX3 for setting to the performance of the plant when the plant is operated at the highest temperature allowed in a case where the component is upgraded is applied. However, fine adjustment is performed for each plant, and the function FX is also adjusted as necessary. The data table TBL2 may be stored in an external storage device. The controller 290d uses one of the functions in the data table TBL2 illustrated in FIG. 10 on the basis of the contract content between the distributor and the customer.

As illustrated in FIG. 5, the measured value of the flue gas temperature and the flue gas setting temperature are input to the subtractor 320b. The subtractor 320b generates a deviation □ between the flue gas temperature and the flue gas setting temperature and outputs the deviation □ to the PI controller 330b. The deviation □ is input to the PI controller 330b. The PI controller 330b outputs the flue gas temperature setting value so that the deviation □ becomes zero. Accordingly, the temperature limit control unit 360 feedback-controls the operation of the gas turbine 2 such that the flue gas temperature (flue gas measured temperature) measured by the flue gas thermometer 190 becomes the setting temperature indicated by the rated temperature control lines T1 and T2 at the time of static determination of the partial load operation or the full load operation.

As illustrated in FIG. 4, the combustion control unit 270 includes a load limit control unit 370, a governor control unit 380, a fuel limit control unit 390, and the low value selector 250. The gas turbine output of the gas turbine 2 is input as the actual output value of the gas turbine 2 to the load limit control unit 370. The load limit control unit 370 generates a fuel command value to order the supply amount (fuel flow rate) of the fuel F to be supplied to the combustor 20 such that the gas turbine output becomes a predetermined value. The load limit control unit 370 outputs the generated fuel command value to the low value selector 250.

The gas turbine output and the rotational speed of the rotor 60 are input to the governor control unit 380. The governor control unit 380 generates a fuel command value on the basis of the gas turbine output and the rotational speed of the rotor 60 such that the rotational speed of the rotor 60 becomes a preset setting rotational speed. The governor control unit 380 outputs the generated fuel command value to the low value selector 250.

The gas turbine output, the rotational speed of the rotor 60, and the cylinder pressure are input to the fuel limit control unit 390. The fuel limit control unit 390 generates a fuel command value on the basis of the gas turbine output, the rotational speed of the rotor 60, and the cylinder pressure such that the supply amount of the fuel F to the combustor 20 does not exceed a preset limit supply amount. The fuel limit control unit 390 outputs the generated fuel command value to the low value selector 250.

The low value selector 250 selects the lowest fuel command value among the fuel command values input from the blade pass temperature control unit 350, the temperature limit control unit 360, the load limit control unit 370, the governor control unit 380, and the fuel limit control unit 390. The low value selector 250 outputs the selected fuel command value to a fuel distribution control unit 430 described below.

The flue gas setting temperature generated by the temperature limit control unit 360 is input to the IGV control unit 280. Further, the cylinder pressure, the blade pass temperature, the flue gas temperature, the gas turbine output, and the intake air temperature are input to the IGV control unit 280. The IGV control unit 280 generates an IGV opening degree command value to control the opening degree of the inlet guide vane 90 on the basis of the input values. The IGV control unit 280 outputs the generated IGV opening degree command value to the IGV operation unit 90b.

Figure 11:
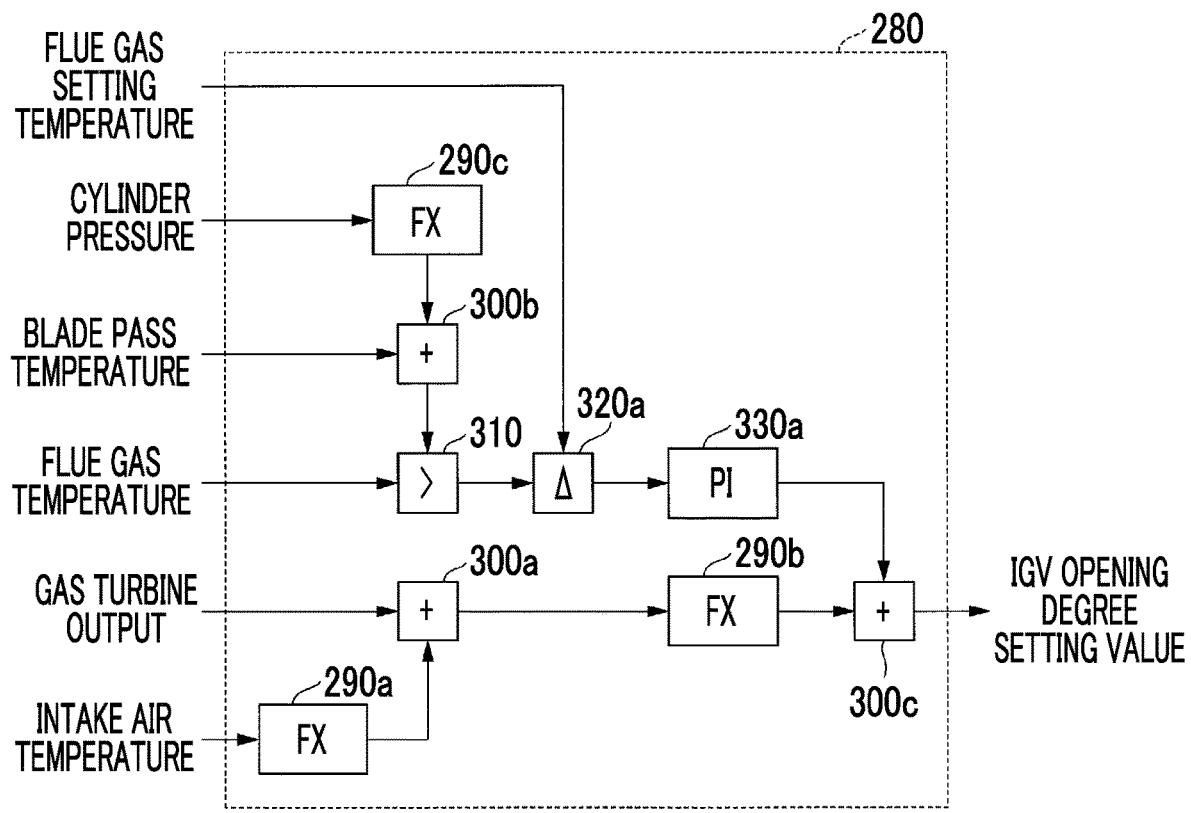
FIG. 11 is a diagram illustrating a configuration of an IGV control unit according to the embodiment of the present invention.

FIG. 11 is a diagram illustrating a configuration of the IGV control unit 280. As illustrated in FIG. 11, the IGV control unit 280 includes a controller 290a, an adder 300a, a controller 290b, a controller 290c, an adder 300b, a high value selector 310, the subtractor 320a, a PI controller 330a, and an adder 300c.

The intake air temperature is input to the controller 290a. The controller 290a generates a correction value for correcting the gas turbine output on the basis of the intake air temperature, and outputs the correction value to the adder 300a. The gas turbine output and the correction value output from the controller 290a are input to the adder 300a. The adder 300a calculates a corrected gas turbine output by adding the gas turbine output and the correction value, and outputs the corrected gas turbine output to the controller 290b.

The gas turbine output which is output from the adder 300a is input to the controller 290b. The controller 290b calculates an IGV opening degree setting value with respect to the input gas turbine output on the basis of the gas turbine output and an IGV opening degree calculation function (first function), and outputs the IGV opening degree setting value to the adder 300c.

Here, the IGV opening degree calculation function will be described. FIG. 12 is a diagram illustrating a relationship between the gas turbine output and the IGV opening degree setting value. In FIG. 12, the horizontal axis indicates the gas turbine output. In FIG. 12, the vertical axis indicates the IGV opening degree setting value. As illustrated in FIG. 12, the IGV opening degree calculation function is a function that defines the relationship between the gas turbine output and the IGV opening degree setting value, and is represented by curves L1 and L2. As indicated by the curves L1 and L2, the IGV opening degree is increased as the gas turbine output is increased from the outputs P1 and P2, and is constant after reaching the outputs P3 and P4. The curves L1 and L2 are not limited to the forms illustrated in FIG. 12, and may include a period in which the IGV opening degree setting value is decreased in the process of increasing the gas turbine output, for example.

The curve L1 indicated by a broken line in FIG. 12 indicates an example of the IGV opening degree calculation function used for the configuration before the component of the gas turbine 2 is upgraded. Further, the curve L2 indicated by a solid line in FIG. 12 indicates an example of the IGV opening degree calculation function used for the configuration after a predetermined component of the gas turbine 2 is upgraded. From the gas turbine output P1 to gas turbine output P4, the IGV opening degree with respect to the same gas turbine output on the curve L2 after the upgrade of the components is smaller than that on the curve L1 before the upgrade of the components. In addition to the curves L1 and L2 illustrated in FIG. 12, a plurality of patterns of functions are set for the IGV opening degree calculation function according to the supply amount of the cooling air after the upgrade of the components and to the locations and types of the stator blades 100, the rotor blades 110, and the split ring 120 to be replaced in the upgrade of the components. The plurality of patterns of functions are stored as, for example, a data table TBL3 in the storage unit 230. The data table TBL3 is a data table illustrated in FIG. 13, for example. As illustrated in FIG. 13, similar to the data table TBL2, the data table TBL3 includes information in which types of components used, introduceable programs, functions FX set in a case where the introduceable program is introduced are associated with each other for the state before and after the upgrade for each plant. The introduceable program is prepared in advance, the function FX is updated in a case where the program is updated due to the upgrade of the components. The data table TBL3 may be stored in an external storage device. The controller 290b uses one of the functions in the data table TBL3 illustrated in FIG. 13 on the basis of the contract content between the distributor and the customer.

As illustrated in FIG. 11, the cylinder pressure is input to the controller 290c. The controller 290c calculates a bias value of the blade pass temperature on the basis of the input cylinder pressure, and outputs the bias value to the adder 300b. The bias value is a value for correcting the measured value of the blade pass temperature measured by the blade pass thermometer 180.

The measured value of the blade pass temperature measured by the blade pass thermometer 180 and the bias value output from the controller 290c are input to the adder 300b. The adder 300b calculates a blade pass temperature by adding the measured value of the blade pass temperature and the bias value, and outputs the blade pass temperature to the high value selector 310.

The flue gas temperature measured by the flue gas thermometer 190 and the blade pass temperature output from the adder 300b are input to the high value selector 310. The high value selector 310 selects a higher value (temperature) between the input flue gas temperature and the input blade pass temperature, and outputs the higher value to the subtractor 320a.

The flue gas setting temperature output from the controller 290d of the temperature limit control unit 360 and the temperature output from the high value selector 310 are input to the subtractor 320a. The subtractor 320a generates a deviation $\square$ between the temperature output from the high value selector 310 and the flue gas setting temperature, and outputs the deviation $\square$ to the PI controller 330a. The deviation $\square$ is input to the PI controller 330a. The PI controller 330a calculates a correction value of the IGV opening degree setting value so that the deviation $\square$ becomes zero, and outputs the correction value to the adder 300c.

The IGV opening degree setting value output from the controller 290b and the correction value of the IGV opening degree setting value output from the PI controller 330a are input to the adder 300c. The adder 300c calculates a corrected IGV opening degree setting value by adding the input IGV opening degree setting value and the input correction value, and outputs the corrected IGV opening degree setting value to the IGV operation unit 90b and a control variable generation unit 400 described below.

As illustrated in FIG. 4, the combustion load control unit 340 controls the ratio of fuel to be supplied to the plurality of fuel supply lines 140, for example. The combustion load control unit 340 includes the control variable generation unit 400 and the fuel distribution control unit 430.

The gas turbine output, the intake air temperature, the IGV opening degree setting value, and the intake air pressure are input to the control variable generation unit 400. The control variable generation unit 400 generates a control variable corresponding to the turbine inlet temperature on the basis of the input values, and outputs the control variable to the fuel distribution control unit 430. The control variable is a value for calculating an opening degree command value of the combustion control valve 150 provided in each of the plurality of fuel supply lines 140. The control variable is a dimensionless value of the temperature (turbine inlet temperature: T1T) of the combustion gas flowing from the combustor 20 to the turbine 30, and is a value corresponding to the turbine inlet temperature.

Here, a procedure of calculating the control variable will be described. In the following description, it is assumed that a control variable corresponding to a case where the turbine inlet temperature is a first reference temperature Ta in a no-load operation is 0% and a control variable in a case where the turbine inlet temperature is a second reference temperature Tb higher than the first reference temperature Ta is 100%. The first reference temperature Ta is set to about 700° C. Further, the second reference temperature Tb is set to about 1500° C. The setting values of the first reference temperature Ta and the second reference temperature Tb are not limited to those described above, and for example, can be set to different values for each gas turbine 2.

The control variable (written as CLCSO) can be expressed by Formula 1 described below.

$$CLCSO = 100 \times (\text{gas turbine output} - Pa)/(Pb - Pa) \quad \text{(Formula 1)}$$

Note that Pa is the gas turbine output at the first reference temperature Ta, and Pb is the gas turbine output at the second reference temperature Tb.

Figure 14:
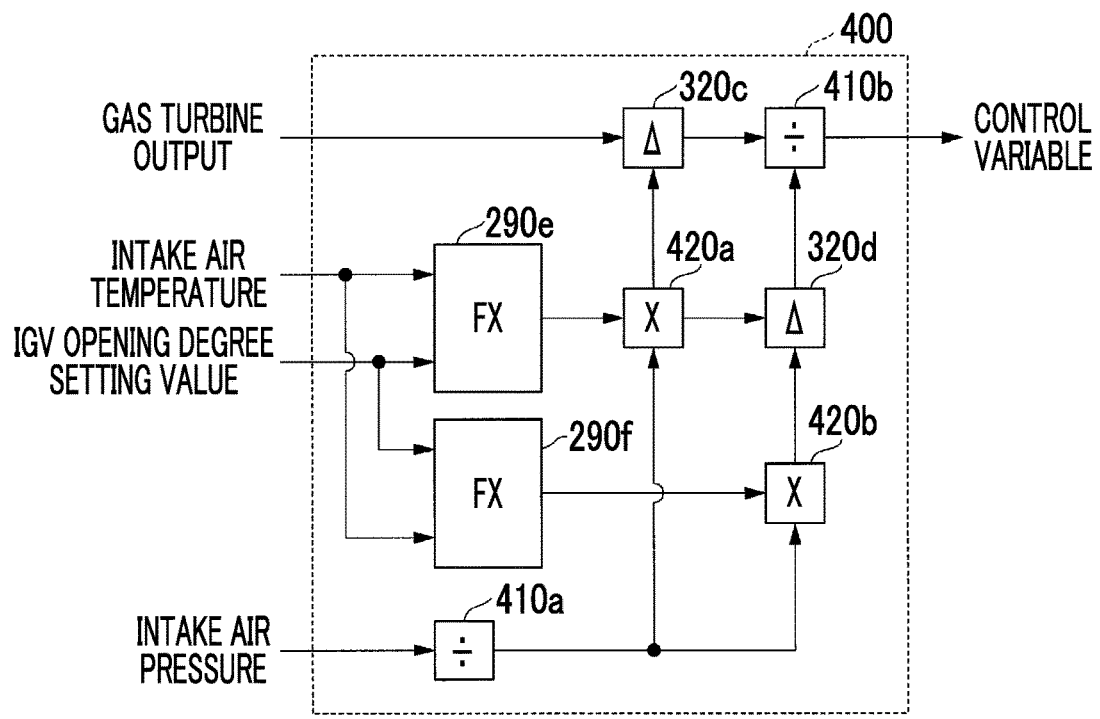
FIG. 14 is a diagram illustrating a configuration of a control variable generation unit according to the embodiment of the present invention.

FIG. 14 is a diagram illustrating a configuration of the control variable generation unit 400. As illustrated in FIG. 14, the control variable generation unit 400 includes a controller 290e, a controller 290f, a divider 410a, a multiplier 420a, a multiplier 420b, a subtractor 320c, a subtractor 320d, and a divider 410b.

The intake air temperature and the IGV opening degree setting value are input to the controller 290e and the controller 290f. The controller 290e calculates a value of Pa on the basis of the intake air temperature, the IGV opening degree setting value, and an output calculation function, and outputs the value of Pa to the multiplier 420a. Further, the controller 290f calculates a value of Pb on the basis of the intake air temperature, the IGV opening degree setting value, and an output calculation function, and outputs the value of Pb to the multiplier 420b.

The relationship between the gas turbine output and the CLCSO is different depending on the IGV opening degree, the intake air temperature of the compressor 10, and the like. That is, in a case where the gas turbine output is the same, the value of the CLCSO is decreased as the IGV opening degree is increased. Further, in a case where the gas turbine output is the same, the value of the CLCSO is increased as the intake air temperature of the compressor 10 is increased. Therefore, the controller 290e and the controller 290f respectively calculate the values of Pa and Pb for each intake air temperature and for each IGV opening degree setting value.

Figure 15:
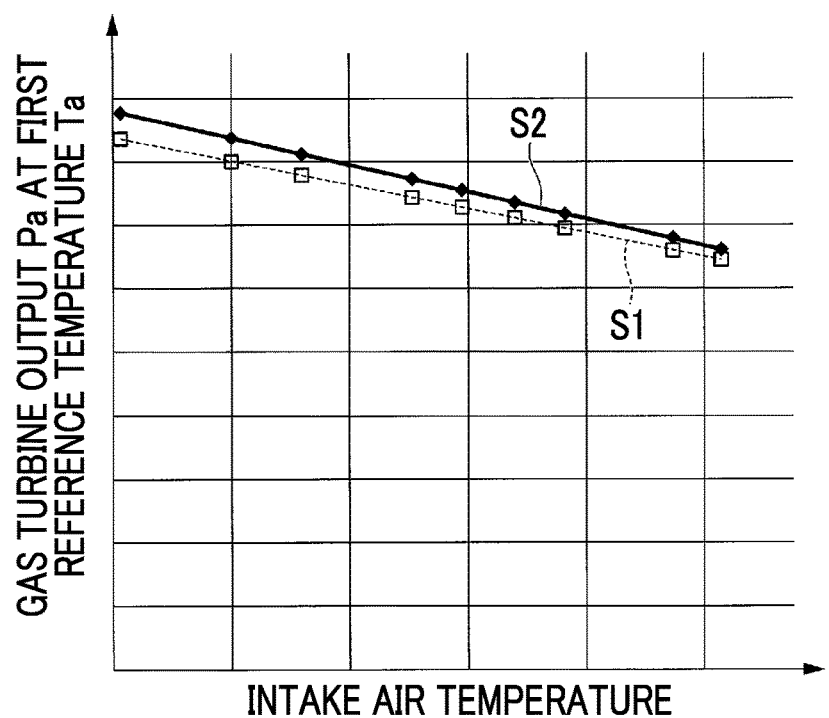
FIG. 15 is a diagram illustrating a relationship between an intake air temperature and a gas turbine output in the embodiment of the present invention.

Here, the output calculation function will be described. FIG. 15 is a diagram illustrating a relationship between the intake air temperature and the gas turbine output. In FIG. 15, the horizontal axis indicates the intake air temperature. In FIG. 15, the vertical axis indicates the gas turbine output. The output calculation function defines the relationship among the IGV opening degree, the intake air temperature, and the gas turbine output. Accordingly, as the form of the output calculation function used in the control variable generation unit 400, the function defining the relationship between the intake air temperature and the gas turbine output may be a set of functions provided for each IGV opening degree, or the function defining the relationship between the IGV opening degree and the gas turbine output may be a set of functions provided for each intake air temperature. FIG. 15 is a diagram illustrating an example of a part of the output calculation function. In FIG. 15, for a predetermined IGV opening degree, the relationships between the intake air temperature at the first reference temperature Ta and the gas turbine output are indicated by straight lines S1 and S2. As indicated by the straight lines S1 and S2, the gas turbine output in this case is reduced as the intake air temperature is increased.

The straight line S1 indicated by a broken line in FIG. 15 indicates an example of the output calculation function used for the configuration before the component of the gas turbine 2 is upgraded. Further, the straight line S2 indicated by a solid line in FIG. 15 indicates an example of the output calculation function used for the configuration after a predetermined component of the gas turbine 2 is upgraded. The gas turbine output with respect to the same intake air temperature on the straight line S2 after the upgrade of the components is larger than that on the straight line S1 before the upgrade of the components. In addition to the straight lines S1 and S2 illustrated in FIG. 15, a plurality of patterns of functions are set for the output calculation function according to the supply amount of the cooling air after the upgrade of the components and to the locations and types of the stator blades 100, the rotor blades 110, and the split ring 120 to be replaced in the upgrade of the components. The plurality of patterns of functions are stored as, for example, a data table TBL4 in the storage unit 230. The data table TBL4 is a data table illustrated in FIG. 16, for example. As illustrated in FIG. 16, similar to the data table TBL2, the data table TBL4 includes information in which types of components used, introduceable programs, functions FX set in a case where the introduceable program is introduced are associated with each other for the state before and after the upgrade for each plant. The introduceable program is prepared in advance, the function FX is updated in a case where the program is updated due to the upgrade of the components. The data table TBL4 may be stored in an external storage device. Each of the controller 290e and the controller 290f is set to use the function according to the IGV opening degree and the intake air temperature in the data table TBL4 illustrated in FIG. 16 on the basis of the contract content between the distributor and the customer.

The intake air pressure is input to the divider 410a. The divider 410a divides the intake air pressure by a standard atmospheric pressure, and outputs an atmospheric pressure ratio (intake air pressure/standard atmospheric pressure) as the division result to the multiplier 420a and the multiplier 420b.

The value of Pa output from the controller 290e and the atmospheric pressure ratio output from the divider 410a are input to the multiplier 420a. The multiplier 420a multiplies the input values together, and outputs a value of Pa in which the atmospheric pressure ratio is considered, which is a multiplication result, to the subtractor 320c and the subtractor 320d. The value of Pb output from the controller 290f and the atmospheric pressure ratio output from the divider 410a are input to the multiplier 420b. The multiplier 420b multiplies the input values together, and outputs a value of Pb in which the atmospheric pressure ratio is considered, which is a multiplication result, to the subtractor 320d.

The value of Pa output from the multiplier 420a and the value of Pb output from the multiplier 420b are input to the subtractor 320d. The subtractor 320d subtracts the value of Pa from the value of Pb (Pb−Pa: refer to Formula 1). The gas turbine output and the value of Pa obtained by the multiplier 420a are input to the subtractor 320c. The subtractor 320c subtracts the value of Pa from the gas turbine output (gas turbine output−Pa: refer to Formula 1).

The output value from the subtractor 320c and the output value from the subtractor 320d are input to the divider 410b. The divider 410b calculates a control variable (refer to Formula 1) by dividing the output value from the subtractor 320c by the output value from the subtractor 320d, and outputs the control variable to the fuel distribution control unit 430.

As illustrated in FIG. 4, the fuel command value output from the low value selector 250 and the control variable output from the divider 410b of the control variable generation unit 400 are input to the fuel distribution control unit 430. The fuel distribution control unit 430 calculates the amount and ratio of the fuel to be supplied to the plurality of fuel supply lines 140 on the basis of the input fuel command value and the input control variable. The fuel distribution control unit 430 sets an opening degree setting value of the fuel regulating valve 150 of each fuel supply line 140 on the basis of the calculation result, and controls the opening degree of each fuel regulating valve 150 on the basis of the opening degree setting value.

The storage unit 230 stores various programs, data, and the like relating to the operation of the gas turbine 2. For example, the storage unit 230 stores data used in the control unit 220, such as the data tables TBL2, TBL3, and TBL4. The change unit 240 changes the setting temperature calculation function, the IGV opening degree calculation function, and the output calculation function used for the control of the gas turbine 2 according to the program introduced on the basis of the supply amount of the cooling air the types and locations of the replaced components after the upgrade of the components. In a case of changing each function, the change unit 240 selects a corresponding function in the data tables TBL2, TBL3, and TBL4 stored in the storage unit 230, according to the introduced program, and changes the function to the selected function.

Figure 17:
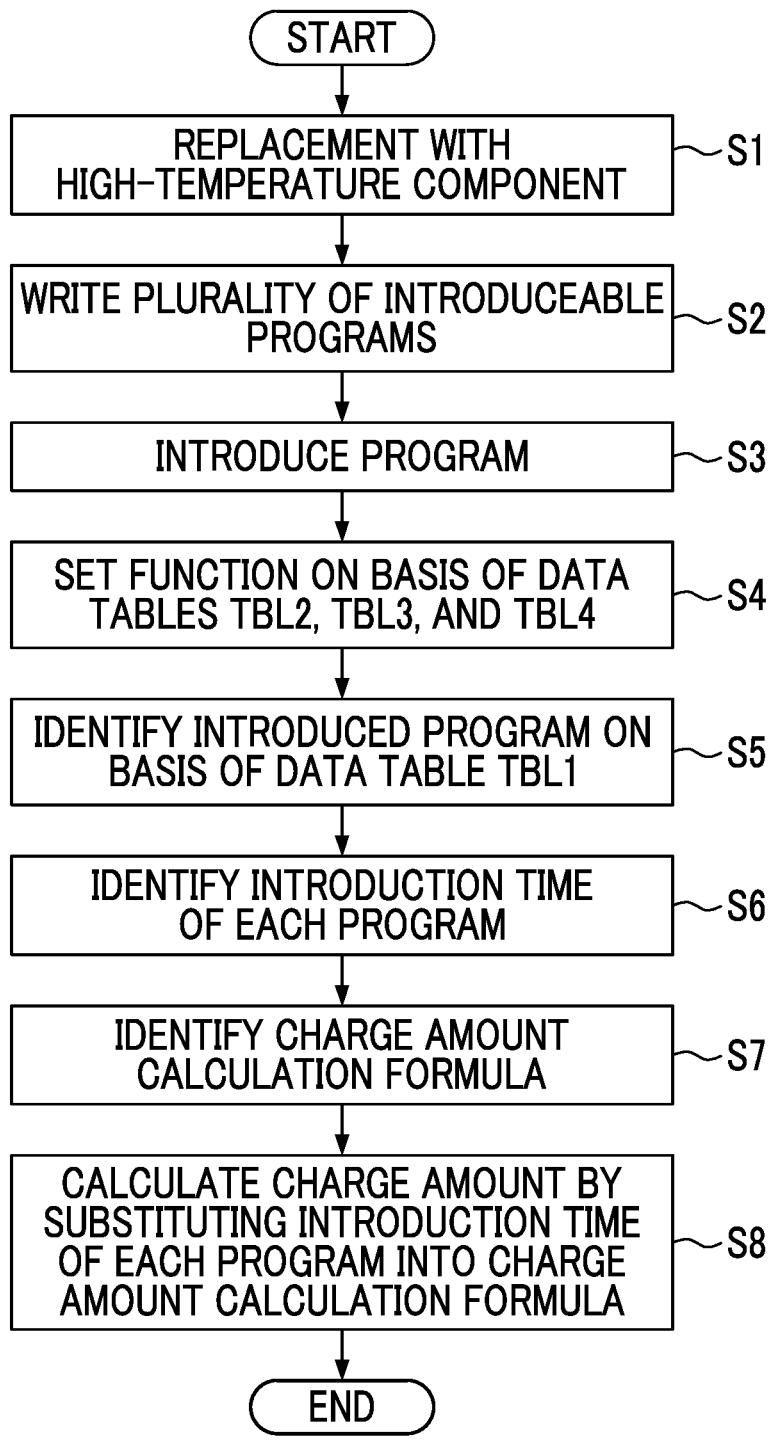
FIG. 17 is a flowchart illustrating a processing flow of the plant operation system according to the embodiment of the present invention.

Next, a process of the plant operation system 1 according to the embodiment of the present invention will be described using FIG. 17.

Here, a process of the plant operation system 1 in a case of upgrading the component in the plant and switching the introduced program by the customer will be described.

The customer replaces the component provided in the plant with a high-temperature component capable of operating the plant with higher performance than that of the existing component (Step S1). The distributor of the high-temperature component writes a plurality of programs, which are introduceable in a case where the component is replaced with the high-temperature component, in the storage unit 230 of the control device 40 (Step S2). The customer introduces one of the plurality of introduceable programs, as a program to operate the plant via the control device 40 (Step S3). The customer can optionally change the program to operate the plant via the change unit 240 of the control device 40. In this case, in a case where the customer introduces a program to improve the performance of the plant as compared with the currently introduced program, the customer is charged according to the introduction time of the program. When the program determined by the customer is introduced, the control device 40 identifies each function according to the program in the data tables TBL2, TBL3, and TBL4, and sets the identified function (Step S4). Further, when the program is introduced, the control device 40 transmits the customer name, information indicating the type of the introduced program, and information indicating the cumulative time from the start of introduction to the management device 41 at every predetermined timing (for example, every time the customer switches the program to be introduced via the control device 40).

The management device 41 receives the customer name, the information indicating the type of the introduced program, and the information indicating the cumulative time from the start of introduction, from the control device 40. The program determination unit 440 identifies a program corresponding to the customer name and the type of the introduced program that are received from the control device 40, in the data table TBL1 (Step S5). The program determination unit 440 outputs the type of the identified program to the charge amount calculation unit 470. The time identification unit 450 identifies the introduction time indicating the cumulative time for which each program is introduced, on the basis of the information indicating the type of the introduced program and the information indicating the cumulative time from the start of introduction that are received from the control device 40 (Step S6). The time identification unit 450 outputs the identified introduction time to the charge amount calculation unit 470.

When the charge amount calculation unit 470 receives the information on the type of the program from the program determination unit 440 and receives the information on the introduction time from the time identification unit 450, the charge amount calculation unit 470 identifies the charge amount calculation formula associated with the customer name received from the control device 40, in the data table TBL1 (Step S7). The charge amount calculation unit 470 calculates the charge amount by substituting the introduction time of each program into the identified charge amount calculation formula (Step S8).

The plant operation system 1 according to the embodiment of the present invention has been described above.

In the plant operation system 1, the components provided in the turbine 30, such as the rotor blades and stator blades are replaced with the upgraded components (high-temperature components) that can be cooled even by the reduced supply amount of cooling air. The storage unit 230 stores a second program to operate the plant with a performance equivalent to or higher than that before the replacement with the upgraded components (for example, program in a case where parameters set by the program are adjusted so that the performance of the plant is improved compared to that before the replacement, after the replacement with the high-temperature component), in addition to the first program for operating the plant which has been used before the replacement with the upgraded components. The change unit 240 (example of switching unit) switches between the first program and the second program in the operation of the plant.

In doing so, in a case where the components are replaced with the upgraded components and the plant is operated using the first program, the performance of the plant can be suppressed, while the performance of the plant does not become lower than the performance before the replacement with the upgraded components.

Accordingly, the customer can reduce the initial cost by the distributor providing the upgraded components at a low price (for example, at the same price as the component before replacement) to the customer. Further, the customer can easily improve the performance of the plant by switching the first program to the second program even after the introduction of the upgraded components. As a result, it becomes easier for the customer to introduce the upgraded components to the plant.

The distributor can realize a plurality of different performances in the plant by switching the programs. That is, the distributor can cope with the replacement of the component in various plants with one type of components. As a result, the distributor can reduce the types of component to manufacture, and can reduce material costs, processing costs, inventory management costs, and the like, and the customer is actually provided with the upgraded components at a low price (for example, at the same price as the component before replacement) from the distributor, and can easily introduce the components having improved reliability and performance. Further, the distributor can make a profit by switching the first program to the second program, that is, charging for improving the performance of the plant, and the customer can selectively improve the performance and can reduce the spending according to the achievements by the performance improvement. Further, there are times when the customer operates the plant a lot and times when the customer does not operate the plant a lot depending on the demand of the electricity market, and there is a risk that the initial investment may not be recovered where there are few opportunities to operate the plant after purchasing the upgraded components, but in a case where the charging method according to the usage time of the present invention is adopted, the risk of unrecovered investment can be reduced.

Thus, a so-called "WIN-WIN" relationship can be established between the customer and the distributor.

In the embodiment of the present invention, it has been described that the data table TBL2 includes the function for setting to the performance of the plant when the plant is operated at the highest temperature allowed in a case where the component is upgraded, and the function which has been used before the component is upgraded. However, in another embodiment of the present invention, the data table TBL2 may include a function for realizing the performance between the performance of the plant when the plant is operated at the highest temperature allowed in a case where the component is upgraded and the performance of the plant before the component is upgraded, in addition to the function for setting to the performance of the plant when the plant is operated at the highest temperature allowed in a case where the component is upgraded and the function which has been used before the component is upgraded.

For example, assuming that there is any temperature control line T3 (not illustrated) between the rated temperature control line T2 after the upgrade and the rated temperature control line T1 before the upgrade illustrated in FIG. 9, a function is obtained from the relationship between the rated temperature control line T1 before the upgrade and the temperature control line T3 by using a method similar to the method of setting the function for setting to the performance of the plant when the plant is operated at the highest temperature allowed in a case where the component is upgraded from the relationship between the rated temperature control line T2 after the upgrade and the rated temperature control line T1 before the upgrade. The storage unit 230 may store the data table TBL2 including the function for setting to the performance of the plant when the plant is operated at the highest temperature allowed in a case where the component is upgraded, the function which has been used before the components are upgraded, and the function obtained from the relationship between the rated temperature control line T1 before the upgrade and the temperature control line T3. In a case where the function obtained from the relationship between the rated temperature control line T1 before the upgrade and the temperature control line T3 is applied, a performance between the performance obtained in a case of applying the function for setting to the performance of the plant when the plant is operated at the highest temperature allowed in a case where the component is upgraded and the performance obtained in a case of applying the function which has been used before the component is upgraded is obtained. The data table TBL2 is a data table illustrated in FIG. 18, for example. As illustrated in FIG. 18, the data table TBL6 includes information in which types of components used, introduceable programs, functions FX set in a case where the introduceable program is introduced are associated with each other for the state before and after the upgrade for each plant. The introduceable program is prepared in advance, the function FX is updated in a case where the program is updated due to the upgrade of the components. For example, regarding the plant A, the introduceable program after the upgrade is the program 2, 3, or 6. In a case of introducing the program 2, the function FX2 which has been used before the upgrade is applied, in a case of introducing the program 3, the function FX3 for setting to the performance of the plant when the plant is operated at the highest temperature allowed in a case where the component is upgraded is applied, and in a case of introducing the program 6, the function obtained from the relationship between the rated temperature control line T1 before the upgrade and the temperature control line T3 is applied. However, fine adjustment is performed for each plant, and the function FX is also adjusted as necessary. The data table TBL6 may be stored in an external storage device. The controller 290d uses one of the functions in the data table TBL6 illustrated in FIG. 18 on the basis of the contract content between the distributor and the customer.

In the embodiment of the present invention, the data tables TBL2, TBL3, and TBL4 have been described as separate data tables. However, in another embodiment of the present invention, one data table in which the data included in the data tables TBL2, TBL3, TBL4, and TBL6 are integrated, such as a data table TBL5 illustrated in FIG. 19 may be used.

Figure 20:
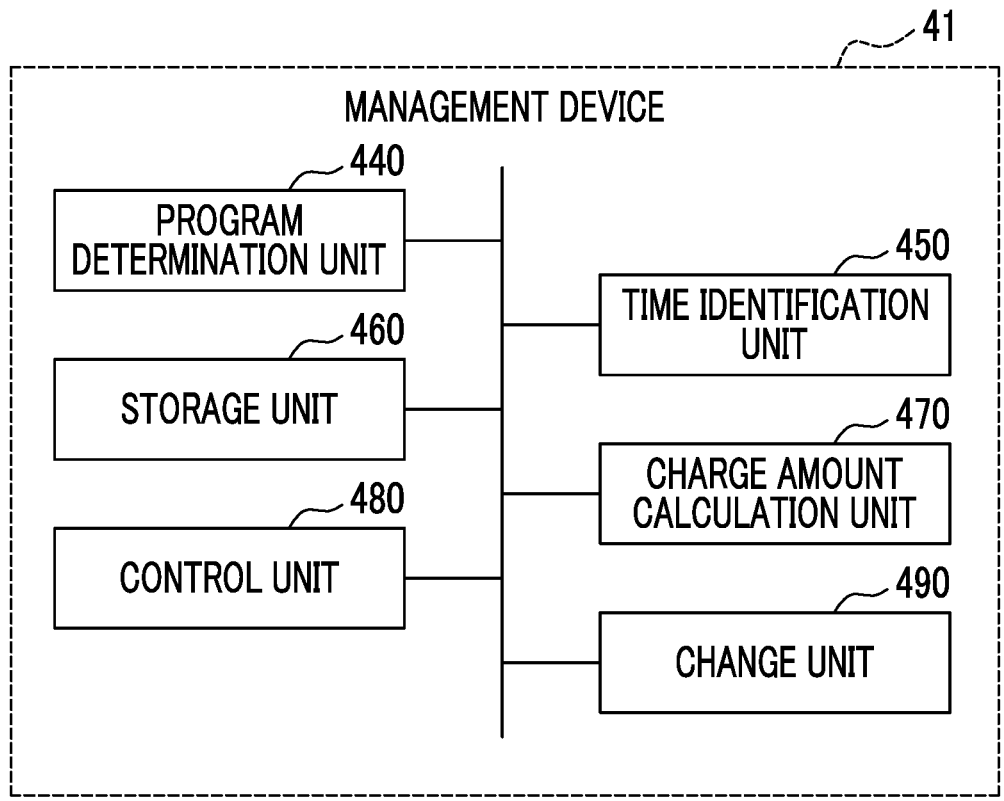
FIG. 20 is a diagram illustrating a configuration of a management device according to another embodiment of the present invention.

In the embodiment of the present invention, it has been described that the control device 40 is a device owned by the customer and in a case where the customer introduces a program to improve the performance of the plant as compared with the currently introduced program, the customer is charged according to the introduction time of the program. However, in a case where the customer has introduced a program to improve the performance of the plant but does not agree to the charging, for example, as illustrated in FIG. 20, the management device 41 may further include a control unit 480 and a change unit 490 to forcibly change the program used to the program that suppresses the performance of the plant regardless of the control by the control device 40.

In the embodiment of the present invention, it has been described that the control device 40 is a device owned by the customer and the customer determines the program to be introduced via the control device 40. However, the control device 40 may be a device provided by the distributor that sells the upgraded component to the customer or the management company that manages the plant according to the request from the distributor. In this case, the customer instructs the distributor or the management company including the control device 40 to introduce a program. The distributor or the management company having received the instruction may determine a program to be introduced via the control device 40.

As for the processing in the embodiment of the present invention, the order of the processing may be changed within a range in which appropriate processing is performed.

Each of the storage unit 230, the storage unit 460, and other storage devices in the embodiments of the present invention may be provided anywhere within a range in which appropriate information is transmitted and received. Further, there may be provided a plurality of storage units 230, a plurality of storage units 460, and a plurality of other storage devices within a range in which appropriate information is transmitted and received, and the storage units and storage devices may store data in a distributed manner.

The embodiment of the present invention has been described, but the plant operation system 1, the control device 40, the management device 41, and other control devices may have a computer system therein. The process of the processing is stored in the form of a program in a computer-readable recording medium, and the processing is performed by a computer reading and executing the program. A specific example of the computer is described below.

Figure 21:
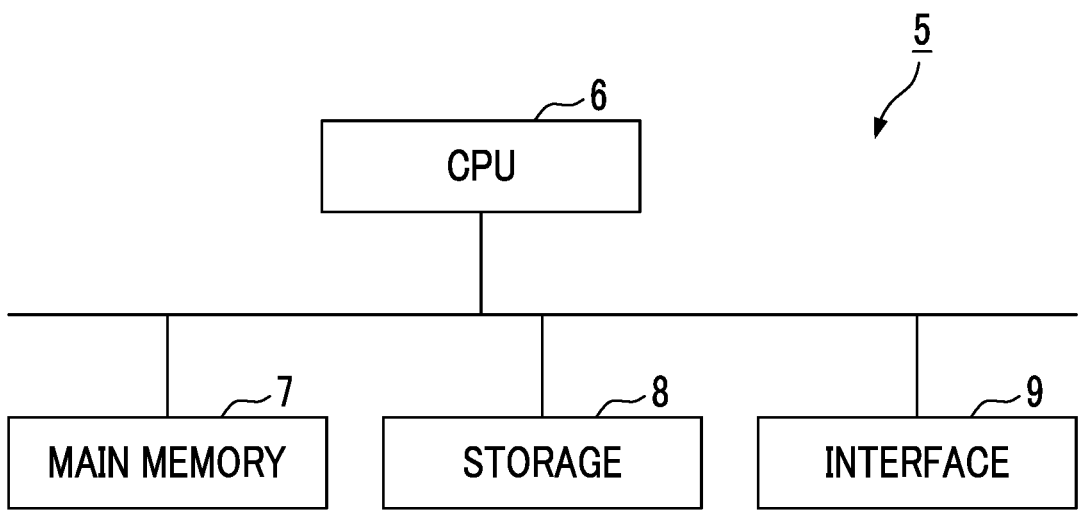
FIG. 21 is a schematic block diagram illustrating a configuration of a computer according to at least one embodiment.

FIG. 21 is a schematic block diagram illustrating a configuration of a computer according to at least one embodiment.

As illustrated in FIG. 21, a computer 5 includes a CPU 6, a main memory 7, a storage 8, and an interface 9.

For example, each of the plant operation system 1, the control device 40, the management device 41, and other control devices is mounted in the computer 5. The operation of each processing unit is stored in the form of a program in the storage 8. The CPU 6 reads the program from the storage 8, develops the program in the main memory 7, and executes the above-described processing according to the program. Further, the CPU 6 secures a storage area corresponding to each of the above-described storage units in the main memory 7 according to the program.

Examples of the storage 8 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage 8 may be an internal medium directly connected to a bus of the computer 5, or may be an external medium connected to the computer 5 via the interface 9 or a communication line. Further, in a case where the program is distributed to the computer 5 by the communication line, the computer 5 having received the distribution may develop the program in the main memory 7 and execute the processing. In at least one embodiment, the storage 8 is a non-transitory tangible storage medium.

Further, the program may realize a part of the above-described functions. The program may be a file that can realize the above-described functions in combination with a program already recorded in the computer system, a so-called difference file (difference program).

Some embodiments of the present invention have been described, but the embodiments are examples, and are not intended to limit the scope of the present invention. Various additions, omissions, replacements, and modifications can be made to the embodiments without departing from the gist of the present invention.

INDUSTRIAL APPLICABILITY

According to the plant operation method, the control device, and the program according to embodiments of the present invention, an opportunity to easily introduce upgraded components to a plant can be provided to a customer.

REFERENCE SIGNS LIST

1: plant operation system
2: gas turbine
3: control system
5: computer
6: CPU
7: main memory
8: storage
9: interface
10: compressor
20: combustor
30: turbine
40: control device
41: management device
50: generator
60: rotor
70: cooling air supply line
80: cooling air control valve
90: inlet guide vane
90a: vane main body
90b: IGV operation unit
100: stator blade
110: rotor blade
120: split ring
130: casing
140: fuel supply line
150: fuel regulating valve, combustion control valve
160: cylinder pressure gauge
170: intake air condition detector
180: blade pass thermometer
190: flue gas thermometer
200: flowmeter
210: output meter
220, 480: control unit
230, 460: storage unit
240, 490: change unit
250: low value selector
260: flue gas temperature control unit
270: combustion control unit
280: IGV control unit
290a, 290b, 290c, 290d, 290e, 290f: controller
300a, 300b, 300c: adder
310: high value selector
320a, 320b, 320c, 320d: subtractor
330a, 330b: PI controller
340: combustion load control unit
350: blade pass temperature control unit
360: temperature limit control unit
370: load limit control unit
380: governor control unit
390: fuel limit control unit
400: control variable generation unit
410a, 410b: divider
420a, 420b: multiplier
430: fuel distribution control unit
440: program determination unit
450: time identification unit
470: charge amount calculation unit
A: air
A1: compressed air
F: fuel
L1, L2: curve
S1, S2: straight line
T1, T2: rated temperature control line
Pa: gas turbine output
Ta: first reference temperature
Tb: second reference temperature
TBL1, TBL2, TBL3, TBL4, TBLS: data table

The invention claimed is:

1. A plant operation method comprising:
a replacement step of replacing a first component provided in a plant with a second component able to operate the plant with a higher performance than the first component in at least one characteristic out of characteristics that demonstrate performance;
an introduction step of introducing a first program for causing the plant to be operated with a first performance of the plant which does not become lower than a performance in a case of using the first component using the second component in at least the one characteristic, and a second program for causing the plant to be operated with a second performance higher than the first performance in at least the one characteristic and the second program being charged; and a first switching step of selectively switching between the first program and the second program, wherein the one characteristic is any of output power, power generation efficiency, and a reduction in discharge of gas.

2. The plant operation method according to claim 1, further comprising:

a calculation step of calculating a charge amount on the basis of switching between the first program and the second program.

3. The plant operation method according to claim 2, further comprising:

an identification step of identifying an execution time for which the second program is executed, wherein in the calculation step, the charge amount is calculated according to the execution time.

4. The plant operation method according to claim 2, wherein the first switching step is executed by a charged customer, and in the calculation step, the charge amount is calculated on the basis of switching between the first program and the second program in the first switching step executed by the customer.

5. The plant operation method according to claim 4, further comprising:

a second switching step of switching the second program to the first program when the customer does not agree to the charging.

6. The plant operation method according to claim 2, wherein the first switching step is executed by a charging administrator, and in the calculation step, the charge amount is calculated on the basis of switching between the first program and the second program in the first switching step executed by the administrator.

7. The plant operation method according to claim 1, wherein the second component is a component that withstands a higher temperature than the first component, in the first switching step, switching to the second program is performed, and the second program causes the plant to be operated such that a temperature of the second component is a high temperature that the second component withstands.

8. A control device comprising:

a storage that stores a first program for causing a plant to be operated using a second component, which is able to operate the plant with a higher performance than a first component provided in the plant in at least one characteristic out of characteristics that demonstrate performance, with a first performance of the plant which does not become lower than a performance in a case of using the first component in at least the one characteristic, and a second program for causing the plant to be operated with a second performance higher than the first performance in at least the one characteristic and the second program being charged; and a processor configured to perform selectively switching between the first program and the second program, wherein the one characteristic is any of output power, power generation efficiency, and a reduction in discharge of gas.

9. A non-transitory storage medium having a program stored therein, the program for causing a computer to execute:

a first logic for causing a plant to be operated using a second component, which is able to operate the plant with a higher performance than a first component provided in the plant in at least one characteristic out of characteristics that demonstrate performance, with a first performance of the plant which does not become lower than a performance in a case of using the first component in at least the one characteristic;

a second logic for causing the plant to be operated with a second performance higher than the first performance in at least the one characteristic and the second logic being charged; and a switching logic for selectively switching between the first logic and the second logic, wherein the one characteristic is any of output power, power generation efficiency, and a reduction in discharge of gas.

* * * * *